(12) United States Patent
Grether et al.

(10) Patent No.: US 12,202,446 B2
(45) Date of Patent: Jan. 21, 2025

(54) FLOW CONTROL VALVE AND SYSTEM FOR CLEANING A VEHICLE SURFACE

(71) Applicant: A. RAYMOND ET CIE, Grenoble (FR)

(72) Inventors: Urs Grether, Efringen-Kirchen (DE); Julien Friedl, Ruederbach (FR); Stéphane Baron, Magstatt le bas (FR); Larry M. Rachow, Lenox, MI (US)

(73) Assignee: A. RAYMOND ET CIE, Grenoble (FR)

( * ) Notice: Subject to any disclaimer, the term of this patent is extended or adjusted under 35 U.S.C. 154(b) by 771 days.

(21) Appl. No.: 17/315,795

(22) Filed: May 10, 2021

(65) Prior Publication Data
US 2021/0261097 A1    Aug. 26, 2021

Related U.S. Application Data

(63) Continuation-in-part of application No. 17/018,159, filed on Sep. 11, 2020.

(30) Foreign Application Priority Data

Sep. 12, 2019    (EP) .................... 19315112

(51) Int. Cl.
*B60S 1/52*    (2006.01)
*B05B 1/30*    (2006.01)
*B60S 1/54*    (2006.01)
*F16K 7/16*    (2006.01)
(Continued)

(52) U.S. Cl.
CPC .............. *B60S 1/52* (2013.01); *B05B 1/3053* (2013.01); *B60S 1/54* (2013.01); *F16K 7/16* (2013.01); *F16K 27/0236* (2013.01); *F16K 27/029* (2013.01); *F16K 31/404* (2013.01)

(58) Field of Classification Search
None
See application file for complete search history.

(56) References Cited

U.S. PATENT DOCUMENTS

| | | |
|---|---|---|
| 2,475,468 A | 7/1949 | Andrews |
| 2,705,608 A | 6/1952 | Phillips |
| 2,738,157 A | 9/1952 | Vargo |

(Continued)

FOREIGN PATENT DOCUMENTS

| | | | |
|---|---|---|---|
| DE | 20300666 U1 | 3/2003 | |
| DE | 102008051584 A1 * | 4/2010 | .............. B60S 1/481 |

(Continued)

OTHER PUBLICATIONS

Machine assisted English translation of WO2018188823A1 obtained from https://patents.google.com/patent on Sep. 10, 2020, pages.

(Continued)

*Primary Examiner* — Spencer E. Bell
*Assistant Examiner* — Omair Chaudhri
(74) *Attorney, Agent, or Firm* — WARNER NORCROSS + JUDD LLP

(57) ABSTRACT

The present disclosure provides a flow control valve for controlling the flow of a cleaning media, such as controlling the flow of cleaning media to a nozzle positioned to distribute the cleaning media to a vehicle surface. The nozzle is integrated with the flow control valve. Vehicles and systems incorporating a flow control valve are also provided.

14 Claims, 14 Drawing Sheets

(51) Int. Cl.
*F16K 27/02* (2006.01)
*F16K 31/40* (2006.01)

(56) References Cited

U.S. PATENT DOCUMENTS

| | | | |
|---|---|---|---|
| 2,888,234 A * | 5/1959 | Dahl | F16K 11/24 |
| | | | 251/118 |
| 3,103,338 A * | 9/1963 | Marmo | F16K 31/404 |
| | | | 251/30.03 |
| 3,208,716 A * | 9/1965 | Rolfe | F16K 31/404 |
| | | | 251/38 |
| 3,521,332 A | 7/1970 | Kramer | |
| 3,544,062 A | 12/1970 | Murray | |
| 3,655,163 A * | 4/1972 | Rattan | F16K 31/404 |
| | | | 251/30.03 |
| 3,784,154 A * | 1/1974 | Ostrowski | F16K 31/404 |
| | | | 251/38 |
| 3,869,152 A | 3/1975 | DeVincent et al. | |
| 3,869,153 A | 3/1975 | DeVincent et al. | |
| 3,872,878 A * | 3/1975 | Kozel | F16K 31/404 |
| | | | 251/30.03 |
| 3,929,356 A | 12/1975 | DeVincent et al. | |
| 4,116,476 A | 9/1978 | Porter et al. | |
| 4,179,096 A | 12/1979 | Fromfield | |
| 4,478,436 A | 10/1984 | Hashimoto | |
| 4,611,831 A | 9/1986 | Truchet | |
| 4,667,987 A | 5/1987 | Knebel | |
| 4,832,582 A * | 5/1989 | Buffet | F04B 43/04 |
| | | | 417/413.1 |
| 4,893,845 A | 1/1990 | Bartholomew | |
| 4,900,065 A | 2/1990 | Houck | |
| 5,071,172 A | 12/1991 | Gross | |
| 1,892,781 A | 1/1993 | Hoenstine | |
| 5,201,552 A | 4/1993 | Hohmann et al. | |
| 5,219,185 A | 6/1993 | Oddenino | |
| 5,234,185 A | 8/1993 | Hoffman et al. | |
| 5,269,333 A * | 12/1993 | Richmond | F16K 31/404 |
| | | | 251/38 |
| 5,271,646 A | 12/1993 | Allread et al. | |
| 5,299,775 A * | 4/1994 | Kolze | G05D 16/2095 |
| | | | 251/38 |
| 5,332,268 A | 7/1994 | Godeau et al. | |
| 5,354,103 A | 10/1994 | Torrence et al. | |
| 5,464,256 A | 11/1995 | Godeau et al. | |
| 5,507,529 A | 4/1996 | Martins | |
| 5,556,137 A | 9/1996 | Ream | |
| 5,556,138 A | 9/1996 | Nakajima et al. | |
| 5,676,342 A * | 10/1997 | Otto | F16K 31/404 |
| | | | 251/38 |
| 5,762,271 A * | 6/1998 | Lind | B05B 1/304 |
| | | | 239/570 |
| 5,775,702 A | 7/1998 | Laeremans et al. | |
| 5,779,280 A | 7/1998 | Hedman | |
| 5,860,677 A | 1/1999 | Martins et al. | |
| 5,951,059 A | 9/1999 | Kitamura | |
| 5,967,487 A | 10/1999 | Cook et al. | |
| 6,058,554 A * | 5/2000 | Warren | B60S 1/3805 |
| | | | 219/202 |
| 6,073,904 A * | 6/2000 | Diller | F16K 31/404 |
| | | | 251/30.03 |
| 6,076,550 A * | 6/2000 | Hiraishi | H01F 7/1607 |
| | | | 251/38 |
| 6,382,678 B1 | 5/2002 | Field et al. | |
| 6,481,756 B1 | 11/2002 | Field et al. | |
| 6,609,732 B1 | 8/2003 | Souvatzidis et al. | |
| 6,684,901 B1 * | 2/2004 | Cahill | F16K 31/0655 |
| | | | 251/291 |
| 6,719,268 B2 | 4/2004 | Fukano et al. | |
| 6,740,827 B1 | 5/2004 | Liantonio | |
| 6,786,468 B2 | 9/2004 | Schroeder | |
| 7,314,208 B1 | 1/2008 | Rightley | |
| 7,604,258 B2 | 10/2009 | Getto et al. | |
| 7,703,740 B1 * | 4/2010 | Franklin | F16K 31/404 |
| | | | 251/39 |
| 7,823,930 B2 | 11/2010 | Feger et al. | |
| 7,976,071 B2 | 7/2011 | Bibby | |
| 8,678,446 B2 | 3/2014 | Nakamura | |
| 9,182,048 B2 | 11/2015 | Rolland et al. | |
| 9,291,276 B2 | 3/2016 | Keren | |
| 9,476,510 B2 | 10/2016 | Buhler | |
| 9,505,382 B2 | 11/2016 | Gokan | |
| 10,024,552 B2 | 7/2018 | Adey et al. | |
| 10,164,373 B1 | 12/2018 | Cheon et al. | |
| 10,260,644 B2 | 4/2019 | Bonanno | |
| 10,286,877 B2 | 5/2019 | Galera et al. | |
| 2002/0030327 A1 | 3/2002 | Florence et al. | |
| 2002/0070546 A1 | 6/2002 | Johll, Jr. et al. | |
| 2002/0096655 A1 * | 7/2002 | Balsdon | F16K 27/029 |
| | | | 251/129.18 |
| 2002/0117850 A1 | 8/2002 | Wood et al. | |
| 2002/0166901 A1 * | 11/2002 | Matsumoto | B05B 15/40 |
| | | | 239/284.1 |
| 2003/0089409 A1 * | 5/2003 | Morimoto | B60S 1/48 |
| | | | 137/859 |
| 2003/0146619 A1 | 8/2003 | Souvatzidis et al. | |
| 2004/0037627 A1 | 2/2004 | Eberle et al. | |
| 2004/0188541 A1 * | 9/2004 | Maruyama | B60S 1/52 |
| | | | 239/570 |
| 2004/0250858 A1 * | 12/2004 | Steerman | F16K 15/025 |
| | | | 137/540 |
| 2005/0023827 A1 | 2/2005 | Walterscheid et al. | |
| 2005/0087633 A1 * | 4/2005 | Gopalan | B05B 1/34 |
| | | | 239/589.1 |
| 2006/0001261 A1 | 1/2006 | Miyajima et al. | |
| 2006/0054224 A1 * | 3/2006 | Lasebnick | B05B 12/04 |
| | | | 137/625.48 |
| 2007/0138422 A1 * | 6/2007 | Najmolhoda | F16K 31/082 |
| | | | 251/129.14 |
| 2007/0257133 A1 * | 11/2007 | Bettenhausen | B60S 1/52 |
| | | | 239/284.1 |
| 2007/0278325 A1 * | 12/2007 | Sato | B60S 1/50 |
| | | | 239/284.2 |
| 2008/0264605 A1 | 10/2008 | Tchang et al. | |
| 2009/0140515 A1 | 6/2009 | Ichimura et al. | |
| 2009/0232585 A1 | 9/2009 | Gilbreath et al. | |
| 2009/0250559 A1 | 10/2009 | Benoit et al. | |
| 2009/0322075 A1 | 12/2009 | Marschall et al. | |
| 2010/0237171 A1 * | 9/2010 | Rathey | B05B 1/08 |
| | | | 239/284.1 |
| 2014/0020663 A1 * | 1/2014 | Pifer | G05D 7/0676 |
| | | | 137/115.06 |
| 2015/0138357 A1 * | 5/2015 | Romack | B60S 1/52 |
| | | | 348/148 |
| 2015/0183406 A1 | 7/2015 | Tanaka et al. | |
| 2016/0146382 A1 | 5/2016 | Weber | |
| 2016/0318486 A1 * | 11/2016 | Weitzel | B60S 1/52 |
| 2016/0339875 A1 * | 11/2016 | Ina | B60S 1/522 |
| 2016/0361481 A1 | 12/2016 | Lisitschew | |
| 2017/0151577 A1 * | 6/2017 | Baltz | B05B 5/035 |
| 2017/0182980 A1 | 6/2017 | Davies et al. | |
| 2017/0209881 A1 * | 7/2017 | Knight | B05B 11/0064 |
| 2017/0225660 A1 | 8/2017 | Trebouet et al. | |
| 2017/0313286 A1 | 11/2017 | Galera et al. | |
| 2018/0079379 A1 * | 3/2018 | Snider | H05B 3/03 |
| 2018/0283572 A1 * | 10/2018 | Bartow | B29C 66/24221 |
| 2018/0361405 A1 * | 12/2018 | Hartman | B05B 7/045 |
| 2019/0061698 A1 * | 2/2019 | Mizuno | B60S 1/0848 |
| 2019/0085999 A1 * | 3/2019 | Chen | F16K 31/0655 |
| 2019/0170047 A1 | 6/2019 | Venekamp et al. | |
| 2019/0186650 A1 | 6/2019 | Asai | |
| 2019/0234547 A1 | 8/2019 | Gauthier | |
| 2019/0359178 A1 * | 11/2019 | Hornby | B60S 1/481 |
| 2020/0189528 A1 * | 6/2020 | Kubota | B08B 5/02 |
| 2020/0231126 A1 | 7/2020 | Giraud et al. | |
| 2020/0317160 A1 * | 10/2020 | Albrecht | F16K 27/003 |
| 2020/0378520 A1 * | 12/2020 | Domoto | F16K 27/00 |
| 2021/0001811 A1 * | 1/2021 | Cosby | B60S 1/02 |
| 2022/0024420 A1 * | 1/2022 | Ringler | B60S 1/52 |
| 2022/0402462 A1 * | 12/2022 | Lim | B05B 1/323 |

(56) References Cited

U.S. PATENT DOCUMENTS

| | | | |
|---|---|---|---|
| 2023/0027750 A1* | 1/2023 | Jullien | B60S 1/481 |
| 2023/0100226 A1* | 3/2023 | Bute | G01S 7/4813 |
| | | | 134/26 |

FOREIGN PATENT DOCUMENTS

| | | | | |
|---|---|---|---|---|
| DE | 102010004213 A1 * | 7/2011 | | B60S 1/52 |
| DE | 112009004389 T5 * | 5/2012 | | F16K 31/402 |
| DE | 102015003836 A1 * | 9/2016 | | B60S 1/481 |
| EP | 0124567 B1 * | 11/1986 | | |
| EP | 2031289 A1 | 3/2009 | | |
| EP | 2095002 B1 | 8/2015 | | |
| EP | 3686067 A1 | 7/2020 | | |
| EP | 3792535 A1 | 3/2021 | | |
| FR | 2873079 A1 * | 1/2006 | | B60S 1/3415 |
| GB | 328056 A | 4/1930 | | |
| GB | 2079863 A * | 1/1982 | | B05B 11/007 |
| KR | 20090062405 A * | 6/2009 | | |
| KR | 20120050107 A * | 5/2012 | | |
| WO | 200076672 A1 | 12/2000 | | |
| WO | 2017220584 A1 | 12/2017 | | |
| WO | 2018188823 A1 | 10/2018 | | |
| WO | 2019029915 A1 | 2/2019 | | |

OTHER PUBLICATIONS

Danfoss Servo-operated 2/2-way solenoid valves data sheet, Jun. 2017, 10 pages.
Danfoss Solenoid valves for water shut off and leak detection data sheet, Dec. 2017, 25 pages.
Machine assisted English translation of DE20300666U1 obtained from https://worldwide.espacenet.com/ on Sep. 28, 2020, 7 pages.
Machine assisted English translation of EP2031289A1 obtained from https://patents.google.com/patent on Sep. 23, 2020, 11 pages.

* cited by examiner

FLOW CONTROL VALVE AND SYSTEM FOR CLEANING A VEHICLE SURFACE

CROSS-REFERENCE TO RELATED APPLICATION(S)

This application is a continuation-in-part of U.S. application Ser. No. 17/018,159, filed Sep. 11, 2020, which claims priority to European Application No. 19315112.3, filed Sep. 12, 2019.

FIELD OF THE INVENTION

The present disclosure generally relates to vehicle cleaning systems and devices, and, more specifically, to flow control valves for controlling the flow of a cleaning media to a nozzle for cleaning a surface, such as a vehicle camera, sensor, or other surface.

DESCRIPTION OF THE RELATED ART

Various cleaning devices for vehicles are known, including nozzles that clean windows, headlights, and other vehicle surfaces. Exterior cameras and driver assistance sensors are increasing in popularity, and many vehicle models have these as standard or optional equipment. Due to the impact of environmental elements to these cameras and sensors, these systems can experience a loss in effectiveness. Said nozzles can be used to clean the lenses of these systems. Self-driving or autonomous vehicles require an even greater number of cameras and sensors for navigation and guidance, driving and safety, and internal performance.

Conventional nozzle designs require a valve to control the flow of cleaning media to the nozzle. Many known flow control valves are compatible with one type of cleaning media, e.g. water or air, and not compatible with others, limiting the usefulness of the nozzle valves across different vehicle fluid line architectures. Such conventional designs are also bulky and heavy. In newer vehicle designs requiring a greater number of cameras and sensors, such as for self-driving or autonomous vehicles, space and weight constraints make conventional nozzle valves undesirable and impractical.

SUMMARY OF THE INVENTION

According to one embodiment, an assembly for cleaning a vehicle surface is provided. The assembly includes a nozzle that is integrated with an electronic valve controlling the flow of a cleaning media to the nozzle, and a power connector. The valve includes a valve body comprising a valve inlet, a valve outlet, and a fluid passage between the valve inlet and the valve outlet. The nozzle comprises a proximal inlet end and a distal outlet end, with the proximal inlet end directly connected to the valve body and at least one cleaning fluid outlet provided at the distal outlet end. An elastomeric sealing element is disposed at an interface between the nozzle and the valve.

In these and other embodiments, the electronic valve comprises a valve seat surrounding an opening in the fluid passage between the valve inlet and the valve outlet, an actuator comprising a plunger having a sealing pin, and a flexible diaphragm moveable into engagement with the valve seat to close the valve and out of engagement with the valve seat to open the valve.

In these and other embodiments, the valve outlet comprises a hollow tip projecting from the valve body through the proximal inlet end of the nozzle and into an interior of the nozzle, with at least one orifice provided on the hollow tip.

In these and other embodiments, the nozzle is snap-fit to the valve outlet to establish a mounted position of nozzle on the electronic valve.

According to another embodiment, an assembly for cleaning a vehicle surface includes multiple nozzles integrated with one electronic valve controlling the flow of cleaning media to each nozzle.

According to yet another embodiment, a vehicle includes a vehicle surface and an assembly for cleaning a vehicle surface, the assembly including a nozzle integrated with an electronic valve controlling the flow of cleaning media to the nozzle.

As described further below, embodiments of the flow control valve, assembly for cleaning a vehicle surface, vehicle, and other systems and methods disclosed herein provide for an improved cleaning of surfaces, such as cameras, sensors, headlights or headlamps, windshield, window, other vehicle surfaces, or other non-vehicle surfaces.

These and other features and advantages of the present disclosure will become apparent from the following description of particular embodiments, when viewed in accordance with the accompanying drawings and appended claims.

DETAILED DESCRIPTION OF THE INVENTION

A flow control valve for controlling the flow of a cleaning media to a nozzle for cleaning a surface, such as a vehicle camera, sensor, or other surface is described below. As will be appreciated from the description here, the flow control valve has multiple applications, but is generally used as a device for controlling the flow of cleaning media to a nozzle for cleaning vehicle surfaces, such as sensors and cameras. It is to be understood that the valve may be used to control the flow of a cleaning media to clean other surfaces, such as a headlight or headlamp, windshield, window, other vehicle surfaces, or other surfaces in non-automotive applications. The valve is adapted to handle different types of cleaning media, including liquids or air.

In some applications, the flow control valve can be provided as an assembly with a nozzle for cleaning a vehicle surface. The assembly may be provided on a vehicle in concealed fashion, or near-concealed fashion, for example within the bumper or panel of a vehicle.

The term "cleaning media" encompasses fluid substances that are capable of flowing, including liquid, air, and mixtures thereof. The term "air" encompasses air and any other gas or mixtures of gasses, unless otherwise noted.

Figure 2:
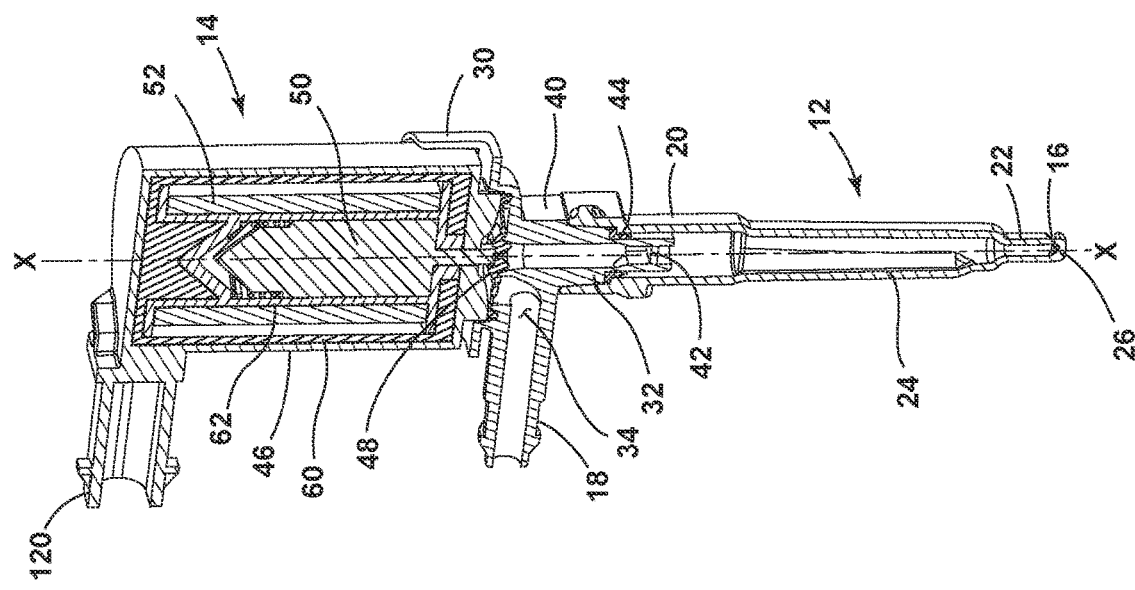
FIG. 2 is a cross-sectional view of the assembly of FIG. 1.
Figure 1:
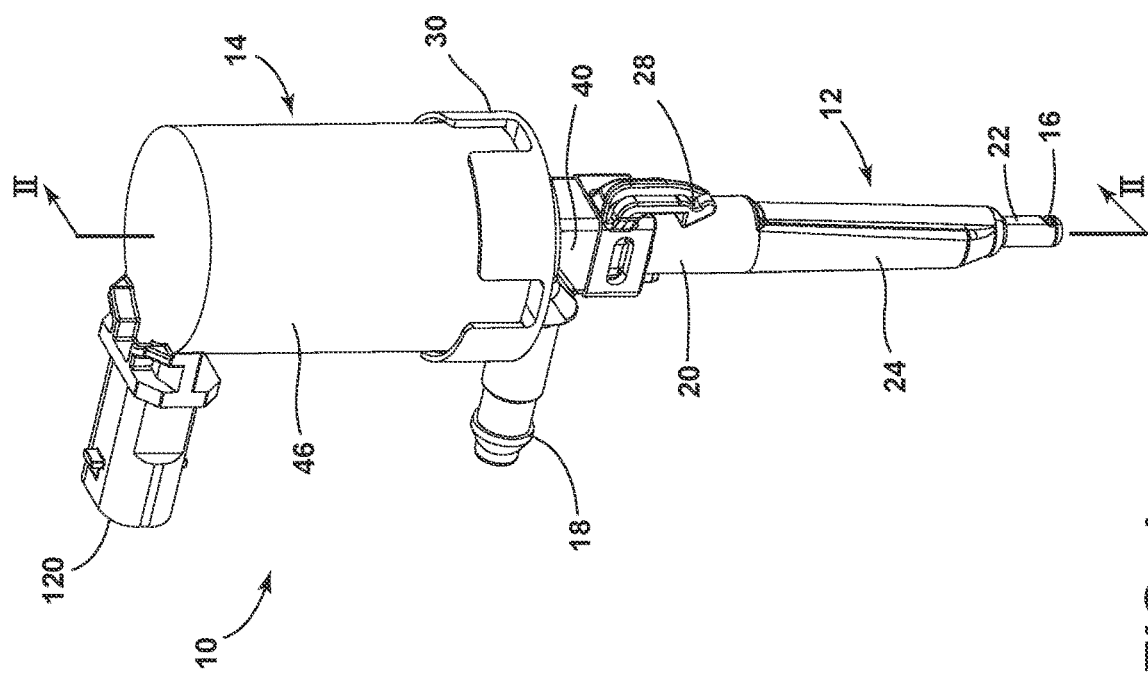
FIG. 1 is a perspective view of an assembly for cleaning a vehicle surface, the assembly including a nozzle and a flow control valve according to one embodiment of the invention.
Figure 3:
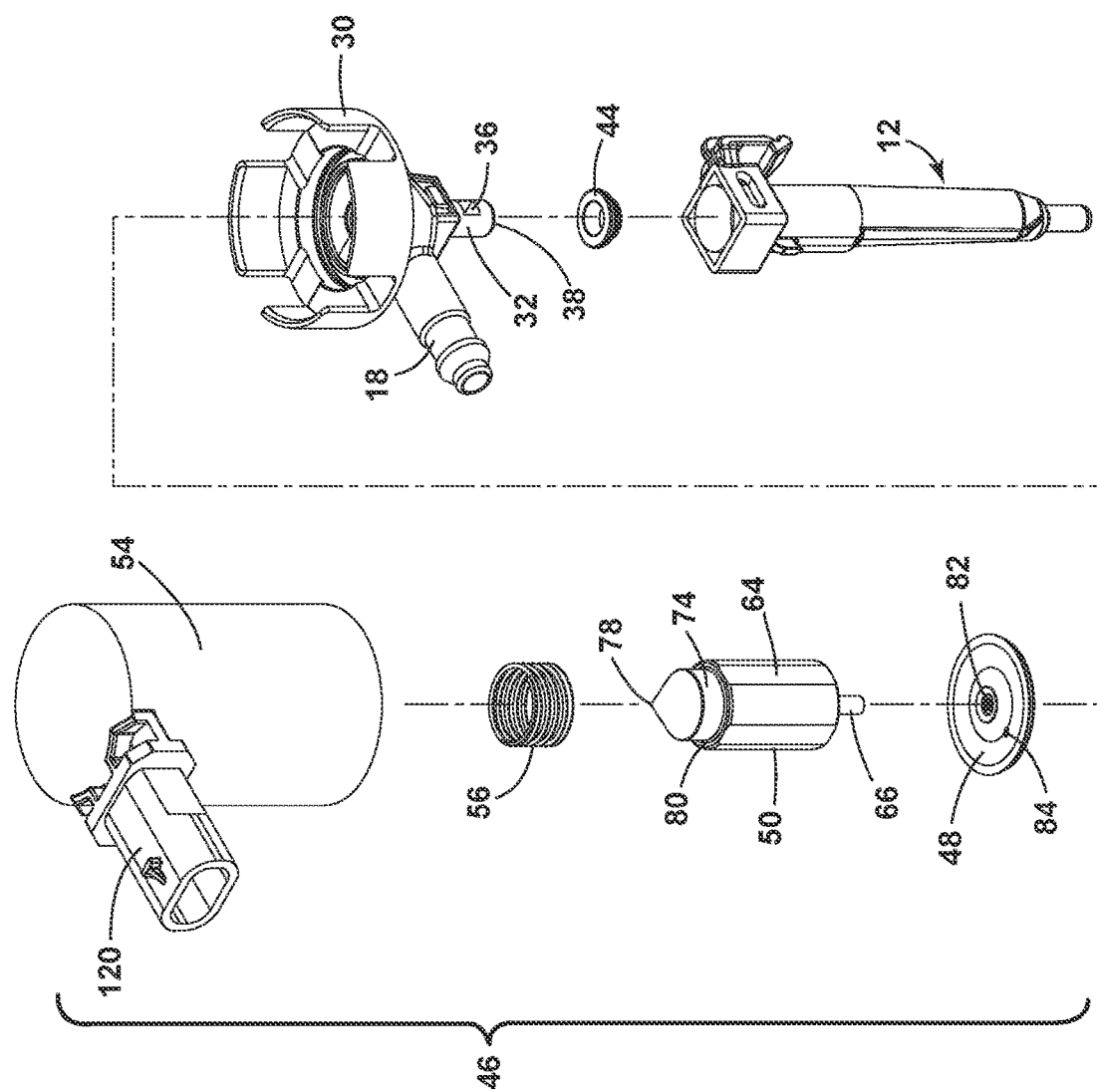
FIG. 3 is an exploded view of the assembly of FIG. 1.

In FIGS. 1-3, an assembly for cleaning a vehicle surface according to a first embodiment of the invention is illustrated and generally designated 10. The assembly 10 includes a nozzle 12 and a valve 14 that controls the flow of cleaning media through the nozzle 12. The nozzle 12 includes at least one cleaning media outlet 16, which can define a fluid outlet of the assembly 10. The valve 14 includes at least one cleaning media inlet 18, which can define a valve inlet of the assembly 10. A fluid flow pathway extends through the assembly 10, from the inlet 18 to the outlet 16. The valve 14 controls the flow of cleaning media through the fluid flow pathway.

The nozzle 12 includes a proximal inlet end 20 and a distal outlet end 22. The at least one cleaning media outlet 16 can be provided at the distal outlet end 22 of the nozzle 12. Optionally, two or more cleaning media outlets 16 can be provided at the distal outlet end 22. The term "proximal" as used herein refers to that end or portion which is situated toward the point of origin of fluid flow, i.e. toward the source of cleaning media and away from the cleaning media outlet 16 in the case of the nozzle 12. The term "distal" as used herein refers to that end or portion which is situated away from the point of origin of fluid flow, i.e. toward the cleaning media outlet 16 in the case of the nozzle 12 and away from the source of cleaning media.

The nozzle 12 can include a peripheral wall 24 elongated along a longitudinal assembly axis X. The peripheral wall 24 can be annular, as shown herein, and comprise one continuous sidewall. In other embodiments, the peripheral wall 24 can be non-annular, and/or can comprise a plurality of sidewalls.

The inlet and outlet ends 20, 22 of the nozzle 12 can be at least partially open. In the illustrated embodiment, the distal outlet end 22 of the nozzle 12 can be partially closed by a distal end wall 26. The at least one cleaning media outlet 16 can optionally be formed through the peripheral wall 24 as shown, or through the distal end wall 26 in other embodiments of the nozzle 12.

The proximal inlet end 20 of the nozzle 12 is connected with the valve 14. The terms "connected" or "connect" are used herein in their broadest sense to mean and encompass the notions of being formed or integrated with, mounted or attached to, or otherwise joined. Optionally, the nozzle 12 can be provided with a mounting clip 28 or other attachment features for installation on a vehicle.

The at least one cleaning media outlet 16 can be any type of cleaning media outlet, suitable for the purposes described herein, including the spraying or dispensing of cleaning media to a vehicle surface. In the illustrated embodiment, the cleaning media outlet 16 comprises an aperture provided in the peripheral wall 24 of the nozzle 12, though the number and disposition of apertures can vary in other embodiments of the invention. The aperture can have any shape and be provided in any form, including, but not limited to, a slot, slit, opening, etc.

The at least one cleaning media outlet 16 can be configured to direct a spray of cleaning media generally radially with respect to the longitudinal assembly axis X. Alternatively, the at least one cleaning media outlet 16 can be configured to direct a spray of cleaning media generally axially along the axis X, generally tangentially relative to the axis X, at an angle between the radial, axial, and/or tangential directions, or in multiple directions relative to the device axis X.

The at least one cleaning media outlet 16 can be configured to produce various spray patterns, i.e. a static fan spray, a static jet spray, etc. A spray-building element such as a chip or eyeball can be provided at the cleaning media outlet 16 for achieving other spray patterns, such as a jet spray, an oscillating fan spray or a combination jet and fan spray. Alternatively, instead of producing a spray of cleaning media, the at least one cleaning out 16 can dispense a stream of cleaning media, or otherwise disburse cleaning media toward the vehicle surface to be cleaned.

The valve 14 can be electronically controlled to selectively allow ingress of cleaning media into the nozzle 12, as described in more detail below. In the embodiment shown herein, the valve 14 is an electronic valve, such as a solenoid valve.

In one embodiment, the valve 14 comprises a valve body 30 having the at least one valve inlet 18 and at least one valve outlet 32. A fluid passage 34 formed in the valve body 30 provides a pathway for cleaning media from the inlet 18 to the valve outlet 32.

The valve outlet 32 can comprise at least one orifice 36 in fluid communication with the nozzle 12. In the embodiment shown herein, the valve outlet 32 can comprise a hollow tip 38 projecting from the valve body 30 through the proximal inlet end 20 of the nozzle 12 and into the interior of the nozzle 12, with the at least one orifice 36 provided on the tip 38.

The valve outlet 32 can include more than one orifice 36. In the illustrated embodiment, multiple orifices 36, for example two orifices 36, are provided in the tip 38, though only one orifice 36 is visible in FIG. 3. The number of orifices 36 can vary in other embodiments of the invention. The orifices 36 can be radially spaced about the tip 38, relative to the axis X. In embodiments with two orifices 36, the orifices 36 can be disposed on opposing sides of the tip 38, i.e. can be diametrically opposed. The orifices 36 can have any shape and be provided in any form, including but not limited to slots, slits, apertures, openings, etc., in the tip 38.

The fluid passage 34 can extend from the valve inlet 18, which can project radially from a side wall 40 of the valve body 30, relative to the axis X, through the orifices 36 at the tip 38, which can project longitudinally from a distal end 42 of the valve body 30, along the axis X. The distal end 42 of the valve body 30 can be closed, with the orifices 36 being provided proximally of the closed distal end 42.

To keep the assembly 10 small and compact, the nozzle 12 can be directly connected with the valve 14. As used herein, "directly connected with" and variations thereof is used herein in the broadest sense to mean and encompass the notions of being directly formed or integrated with, directly mounted or attached to, or otherwise directly joined. In the illustrated embodiment, the nozzle 12 and the valve body 30 are separate components, and can be attached together by using any suitable mechanical coupling or other interlock, such as a snap fit coupling or quick-connect coupling. A sealing element 44 is provided at the interface between the nozzle 12 and the valve body 30 to prevent leakage of cleaning media at the interface. In illustrative embodiment, the sealing element 44 is manufactured from an elastomeric material, such as silicone rubber. The tip 38 can support the sealing element 44 thereon. In an alternate embodiment, the nozzle 12 and the valve body can be integrally formed, such as by plastic injection molding. In this case, a sealing element may not be required. In another alternative embodiment, the nozzle 12 can be remote from the valve 14, with a fluid line such as a hose, tubing, or other conduit, fluidly connecting the outlet 32 of the valve 14 with the inlet end 20 of the nozzle 12. In yet another alternative embodiment, the nozzle 12 can be telescoping, and can move from an inactive position to active position. In moving to the active position, the nozzle telescopes to an extended position and the nozzle sprays cleaning media on a vehicle surface. In the inactive position, the nozzle is retracted and is concealed or hidden.

The valve 14 includes an actuator 46 and a pilot-operated valve member comprising a flexible diaphragm 48 that operates to open and close the valve 14 as described in further detail below. The actuator 46 of the illustrated embodiment is a solenoid actuator including a plunger 50 and a coil 52 concentrically arranged within an actuator housing 54. The plunger 50 is configured for linear reciprocal movement along the axis X. A closing spring 56 urges the plunger 50 toward the diaphragm 48, i.e. toward a closed position.

In the illustrated embodiment, the valve body 30 is coupled with the actuator housing 54. The valve body 30 can be coupled with the actuator housing 54 using any suitable mechanical coupling or other interlock, such as a snap fit coupling or joint. In other embodiments, the valve body 30 can be integrally formed with the actuator housing 54, such as by plastic injection molding.

The actuator housing 54 can include an outer housing 60 and an inner housing or core tube 62. The coil 52 can be provided between the outer housing 60 and core tube 62, with the core tube 62 isolating the coil 52 from the cleaning media. The plunger 50 is linearly reciprocal within the core tube 62. Other configurations for the actuator housing 54 are possible.

A power connector 120 on the actuator housing 54 is connectable to an external current supply to control the solenoid valve actuator 46 by an electrical current that passes through the coil 52. Power consumption and supply requirements of the solenoid valve actuator 46 can vary depending on the application, and can, for example, be provided from a 12V, 24V, 48V, PWM or BUS system, depending on the application.

Figure 5:
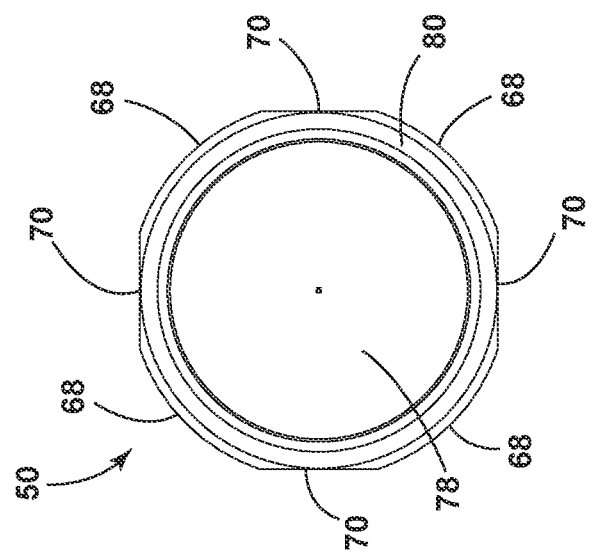
FIG. 5 is a top view of the plunger from FIG. 4.
Figure 4:
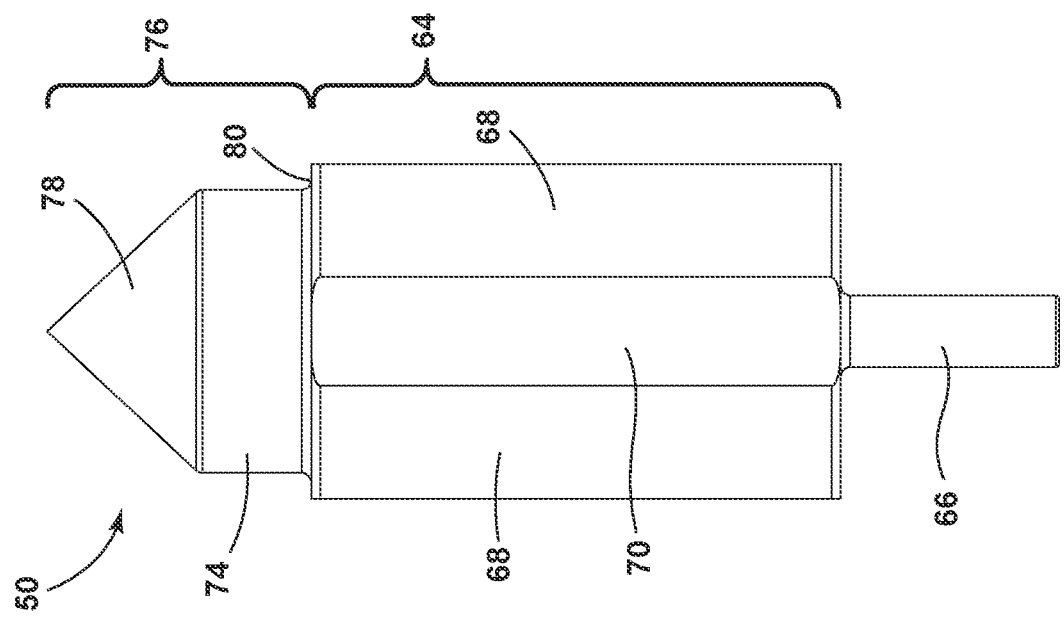
FIG. 4 is a side view of a plunger for the flow control valve of FIG. 1.

One embodiment of the plunger 50 is shown in FIGS. 4-5. The plunger 50 includes an elongated cylindrical body 64 with a sealing element, such as a pin 66, on one end thereof. The cylindrical body 64 can include one or more cylindrical surfaces 68 for precise guidance and one or more flat surfaces 70 for fluid flow. The cylindrical surfaces 68 allow for precise guidance of the plunger 50 within the core tube 62 for actuating efficiency.

The plunger 50 can optionally include a reduced diameter portion 74 on one end thereof for integration of the closing spring 56 within a diameter defined by the cylindrical body 64. The reduced diameter portion 74 has a sidewall 76 extending from the cylindrical body 64 in a direction opposite the sealing pin 66 and a conical end 78. The reduced diameter portion 74 forms a shoulder 80 between the sidewall 76 and cylindrical body 64 against which the closing spring 56 presses.

Figure 6:
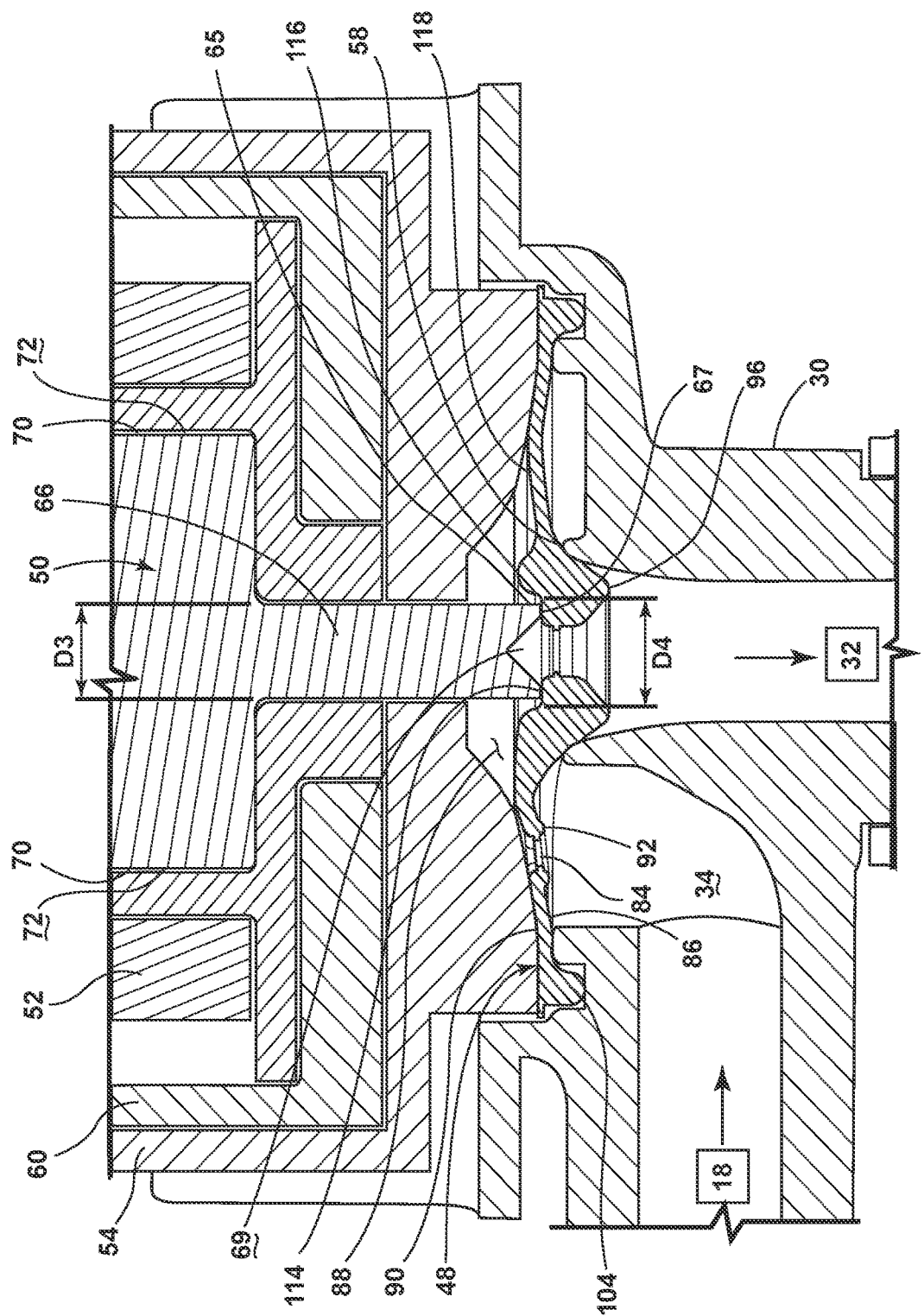
FIG. 6 is an enlarged sectional view of a portion the flow control valve, showing a closed position of the valve where a diaphragm is sealed against a valve seat by a plunger.

Referring to FIG. 6, the valve body 30 comprises a valve seat 58 surrounding an opening in the fluid passage 34 between the valve inlet 18 and the valve outlet 32. The diaphragm 48 flexes into engagement with the valve seat 58 to close the valve 14 and flexes away from the valve seat 58 to open the valve 14, as discussed in more detail below. The pin 66 of the plunger 50 is configured to press the diaphragm 48 against the valve seat 58, and improve sealing in the closed position. Channels 72 are defined between the flat surfaces 70 of the plunger 50 and the inner surface of the core tube 62 for cleaning media to flow to the spring-end of the plunger 50.

The diaphragm 48 includes a drain passage 82 and a pilot or bypass hole 84 offset from the drain passage 82. The drain passage 82 is in registry with a proximal end of the valve outlet 32 and with the pin 66 of the plunger 50. The bypass hole 84 is in registry with the valve inlet 18 and allows a small amount of cleaning media to flow through a first side 86 of the diaphragm 48, also referred to herein as the main passage side, and fill a pilot chamber 88 on a second, opposite side 90 of the diaphragm 48, also referred to herein as the bypass side of the diaphragm 48.

Figure 7:
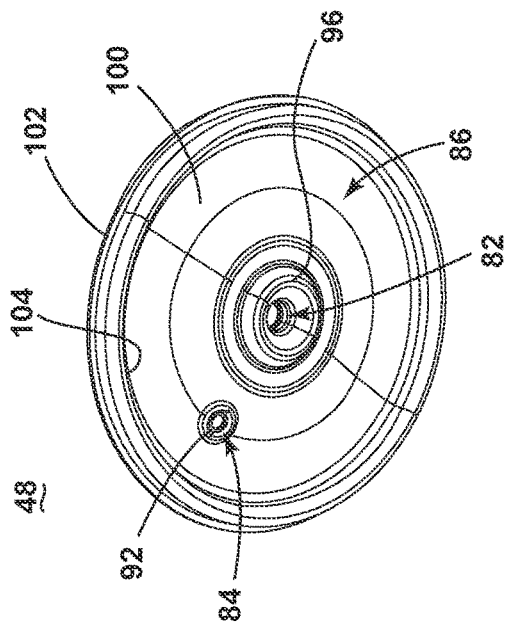
FIG. 7 is a top perspective view of a diaphragm for the flow control valve of FIG. 1.
Figure 8:
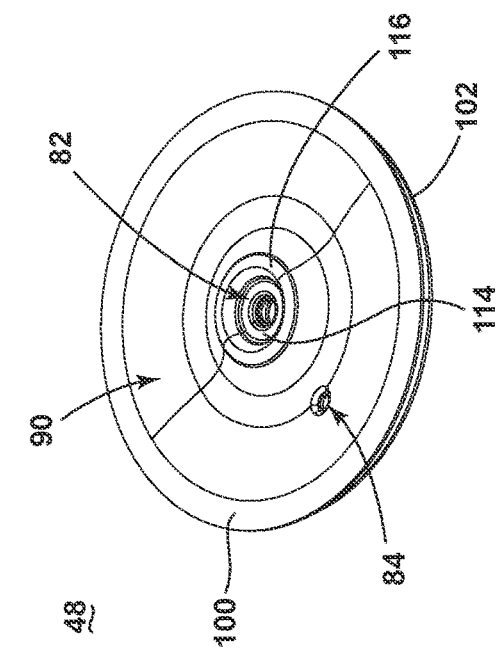
FIG. 8 is a bottom perspective view of a diaphragm for the flow control valve of FIG. 1.
Figure 9:
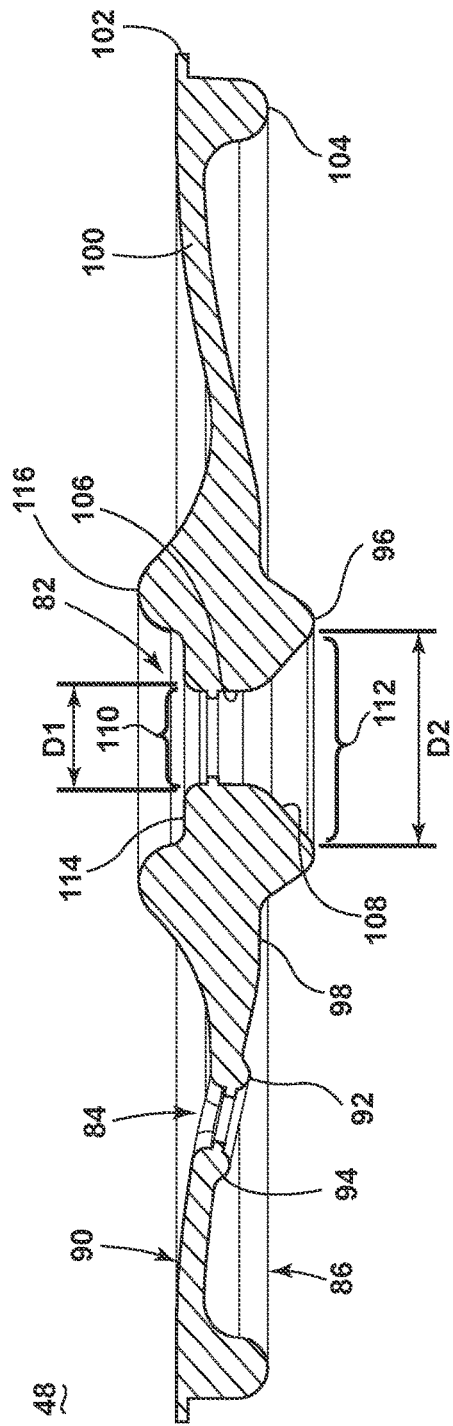
FIG. 9 is a cross-sectional view of the diaphragm from FIG. 7.

One embodiment of the diaphragm 48 is shown in FIGS. 7-9. A reinforcement protrusion 92 can extend around the bypass hole 84 on the first side 86 of the diaphragm 48. The reinforcement protrusion 92 projects outwardly from a surrounding surface 94 of the first side 86 and prevents damage to the bypass hole 84 over the expected lifetime of the valve 14. In some applications, the valve 14 is expected to cycle many times (i.e. on the order of one opening per every 55 ms) and experience high pressure (i.e., up to 10 or 15 bar). Without the reinforcement protrusion 92, repeated valve cycling at high operational pressure may damage (e.g. tear) the bypass hole 84.

The drain passage 82 is in registry with the pilot chamber 88 and allows cleaning media to flow from the pilot chamber 88 through the diaphragm 48. The drain passage 82 includes a first opening 110 on the bypass side 90 of the diaphragm 48 and a second opening 112 on the main passage side 86 of the diaphragm 48. The first opening 110 has a first diameter D1 and the second opening 112 has a second diameter D2. The first diameter D1 can be smaller than the second diameter D2. In other embodiments, the first and second diameters D1, D2 can be equal.

Optionally, the drain passage 82 can include a cylindrical portion 106 defining the first opening 110 at one end thereof, and a frustoconical portion 108 defining the second opening 112 at one end thereof. The cylindrical portion 106 can have consistent diameter equal to the diameter D1 of the first opening 110. The frustoconical portion 108 can widens toward the main passage side 86 of the diaphragm 48, with the second opening 112 defined at the widest point of the frustoconical portion 108. This shape can be helpful during manufacturing of the diaphragm 48 to prevent burrs on the external surface.

The drain passage 82 lets cleaning media flow out of the pilot chamber 88 to balance the pressure on either side of the diaphragm 48 after translation of the plunger 50, i.e. when the solenoid actuator 46 is actuated during opening of the valve 14. The pilot chamber 88 can be defined by the bypass side 90 of the diaphragm 48 and the interior space between the core tube 62 and plunger 50, including the channels 72.

The pin 66 on the plunger 50 selectively blocks the drain passage 82 of the diaphragm 48 when the solenoid actuator 46 is not actuated. A pin seat 114 can surround the first opening 110 on the bypass side 90 of the diaphragm 48. The sealing pin 66 is in registry with the pin seat 114. The pin 66 has a diameter D3 that is smaller than a diameter D4 of the pin seat 114. In the embodiment shown, the diameter D3 of the pin 66 is greater than the diameter D1 of the first opening 110 to insure good sealing of the drain passage 82 when the valve 14 is closed.

A plunger sealing protrusion 116 can surround the pin seat 114 and define the diameter D4 of the pin seat 114 at an inner surface thereof. The plunger sealing protrusion 116 can project outwardly from a surrounding surface 118 of the bypass side 90 of the diaphragm 48. The pin seat 114 and plunger sealing protrusion 116 create a recessed shape that is counter to the shape of the sealing pin 66. The plunger sealing protrusion 116 also reinforces the pin seat 114 and first opening 110, which are subject to higher forces and friction from the plunger 50.

The sealing pin 66 can include a terminal end 65 that presses against the diaphragm 48 when the valve 14 is closed as shown in FIG. 6. Optionally, the terminal end 65 has a narrow sealing edge 67 that engages the pint seat 114. The narrow sealing edge 67 can have smooth edges to prevent damage to the diaphragm 48. The narrow sealing edge 67 can be formed by a conical recess 69 in the terminal end 65.

A valve sealing protrusion 96 can surround the second opening 112 of the drain passage 82. The sealing protrusion 96 projects outwardly from a surrounding surface 98 of the main passage side 86, which may be contiguous with the surface 94 from which the reinforcement protrusion 92 projects.

When the valve 14 is closed by the force of the plunger 50 against the diaphragm 48, at least a portion of the valve sealing protrusion 96 is pushed past the valve seat 58 and protrudes into the valve outlet 32, which provides a transverse component to the sealing force of the plunger 50 on the diaphragm 48. The diaphragm 48 is thereby pinched between the pin 66 and the valve seat 58, which can provide improved sealing over a solely compressive sealing force.

The diaphragm 48 may include a substantially disc-shaped body 100 having a substantially circular periphery 102, with the drain passage 82 located at the center of the disc-shaped body 100 and the bypass hole 84 offset from the center of the disc-shaped body 100. An assembly protrusion 104 can extend around the periphery 102 of the disc-shaped body 100 and can project outwardly from one or both sides 86, 90 of the diaphragm 48. As shown in FIG. 6, the assembly protrusion 104 is compressed between the valve body 30 and the actuator housing 54, and holds the diaphragm 48 in place when the diaphragm 48 is deformed from pressure changes and operation of the solenoid valve actuator 46.

In illustrative embodiment, the diaphragm 48 is manufactured from an elastomeric material that is both resilient and flexible. The diaphragm 48 can be made from any elastomeric material that can elastically deform under fluid pressure changes and movement of the plunger 50 to open and close the valve 14. In one example, the elastomeric material can be EPDM (ethylene propylene diene methylene rubber), optionally glass fiber-reinforced EPDM. Another suitable elastomeric material may be silicone rubber.

Figure 10:
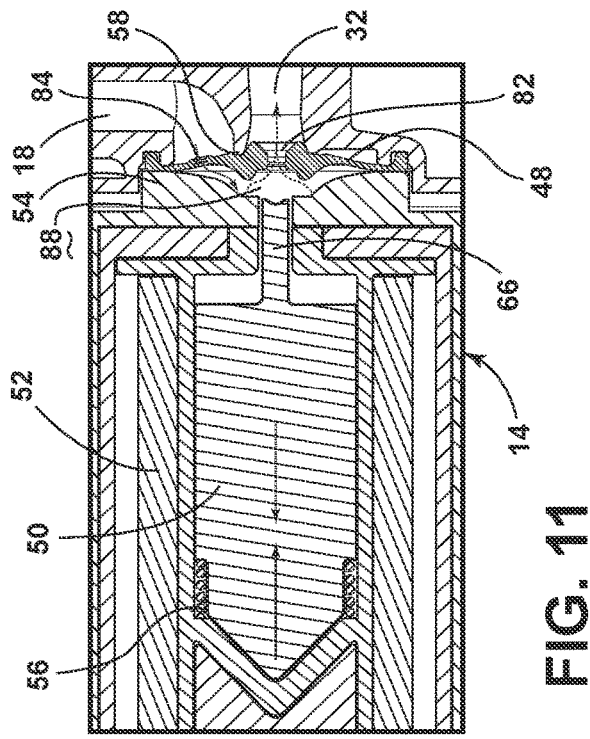
FIGS. 10-14 illustrate the operation of the flow control valve of FIG. 1.

FIGS. 10-14 illustrate the operation of the flow control valve 14. As shown in FIG. 10, when the coil 52 is not energized, the plunger 50 is urged toward the diaphragm 48 by the closing spring 56. The pin 66 of the plunger 50 presses the diaphragm 48 against the valve seat 58 to close the valve 14 and block the drain passage 82. The bypass hole 84 is configured to equalize pressure on both sides of the diaphragm 48 when the plunger 50 is in the closed position. The bypass hole 84 allows a small amount of cleaning media to flow through the diaphragm 48 and fill the pilot chamber 88 on the opposite side of the diaphragm 48. The sum of the fluid pressure in the pilot chamber 88 and the force from the closing spring 56 on the diaphragm 48 is equal to or greater than the fluid pressure on the diaphragm 48 from the valve inlet 18 and the fluid pressure on the plunger 50 in order to maintain the diaphragm 48 against the valve seat 58 with good sealing and no leakage.

Figure 11:
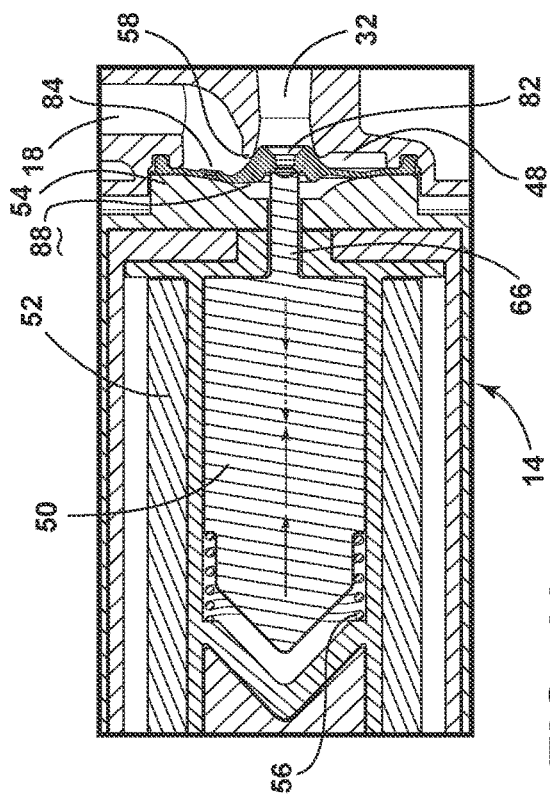

As shown in FIG. 11, when the coil 52 is energized, the plunger 50 is moved against the force of the closing spring 56 via magnetic force, and the pin 66 on the plunger 50 withdraws from the diaphragm 48 to unblock the drain passage 82. Cleaning media in the pilot chamber 88 is now free to flow through the drain passage 82. The pressure in the pilot chamber 88 drops below that of the inlet pressure, and the diaphragm 48 begins to deform from the inlet side.

Figure 12:
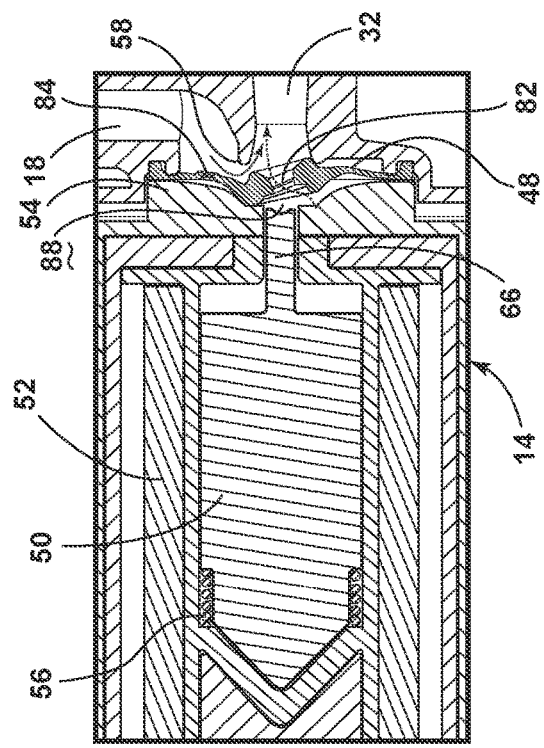

Referring to FIG. 12, as the diaphragm 48 continues to deform and flexes away from the valve seat 58, cleaning media can flow directly from the valve inlet 18 to the valve outlet 32, i.e. without crossing from one side of the diaphragm 48 to the other. The pressure from fluid in the pilot chamber 88 continues to decrease as cleaning media flows through the drain passage 82. The changing pressures continue to deform the diaphragm 48 until it reaches the fully open position, shown in FIG. 13.

Figure 13:
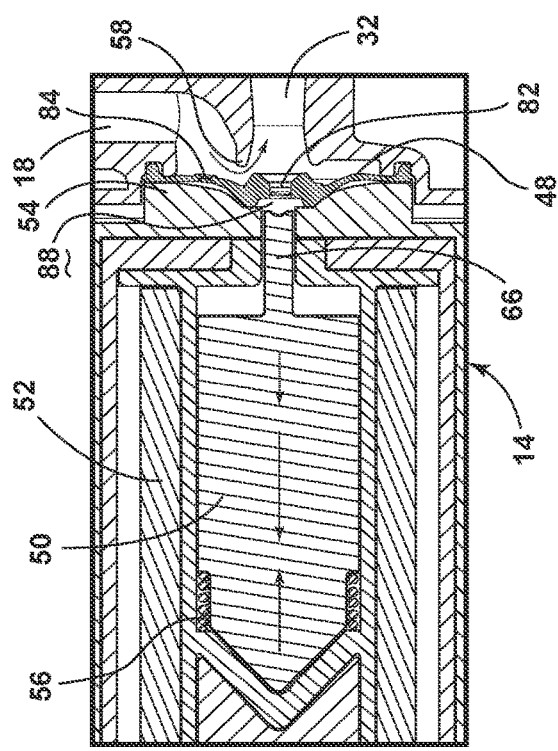

Referring to FIG. 13, the diaphragm 48 is now fully open and fluid from the valve inlet 18 flows directly to the valve outlet 32. The passage between the bypass hole 84 and the drain passage 82 can be closed by a portion of the actuator housing 54 and/or the re-engagement of the diaphragm 48 with the pin 66 of the plunger 50.

Figure 14:
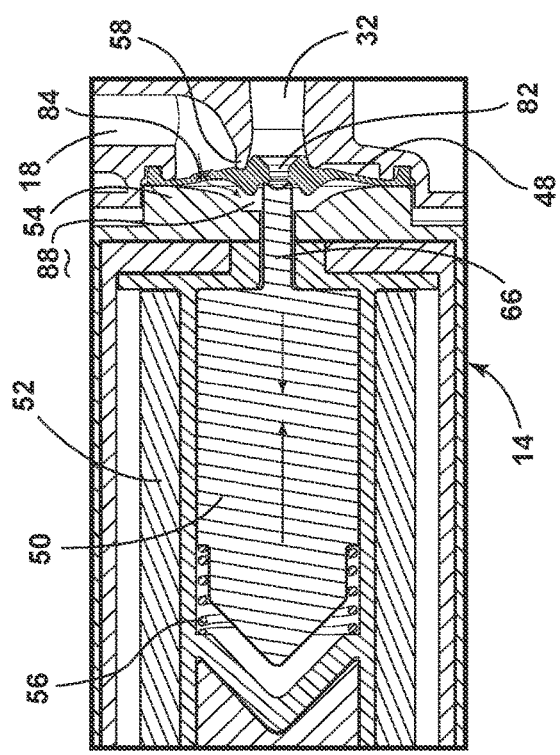

Referring to FIG. 14, when the coil 52 is de-energized, the closing spring 56 moves the plunger 50 back toward its non-actuated position, which pushes the diaphragm 48 against the valve seat 58. The fluid pressure in the pilot chamber 88 is initially low, and increases as cleaning media flows through the bypass hole 84. Once the sum of the fluid pressure in the pilot chamber 88 and the force from the closing spring 56 on the diaphragm 48 is balanced with the fluid pressure on the diaphragm 48 from the valve inlet 18, the valve 14 is in the initial position shown in FIG. 10.

Figure 15:
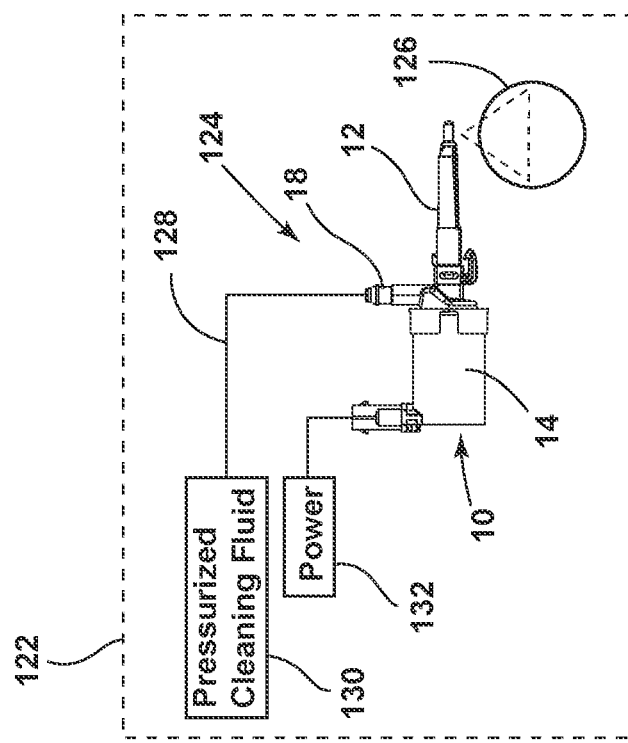
FIG. 15 is a schematic illustration of a vehicle including one assembly for cleaning a vehicle surface according to FIG. 1.

In FIG. 15, a vehicle 122 with a system 124 for cleaning a vehicle surface 126 of the vehicle 122 according to a one embodiment of the invention is schematically illustrated.

The system 122 includes a nozzle/valve assembly 10 as described with respect to FIGS. 1-14, a fluid flow pathway 128 supplying pressurized cleaning media 130 to the inlet 18 of the valve 14, the valve 14 controlling the flow of cleaning media through the nozzle 12. The nozzle 12 is positioned to deliver cleaning media to the vehicle surface 126. The cleaning media 130 is put under pressure from an external system, e.g. a pump or compressor (not shown). The operating pressure can optionally be less than 15 bar, alternatively between 1 and 10 bar, inclusive.

The valve 14 is connected to a power supply 132 of the vehicle 122. The open/close status of the valve 14 can be controlled on demand from a control unit (not shown). The supply of cleaning media to the assembly 10 can be automated, with cleaning media being supplied automatically predetermined intervals or on an as-needed basis, or can be manual, such as by providing a switch (not shown) in the vehicle cabin that is manually-actuatable by a driver of the vehicle.

The system 124 can further be provided with a heating element for heating the cleaning media before it is applied to the vehicle surface, and additional conduits, ducts, tubing, hoses, fluid connectors, and/or manifolds (not shown) fluidly coupling components of the system 124 together and providing a fluid flow path from the source of pressurized cleaning fluid 130 to the assembly 10.

The vehicle surface 126 can comprise a camera, a sensor, a front windshield, a rear windshield, a headlight or headlamp, other another vehicle surface. The assembly 10 can be mounted in various locations on the vehicle 122 to the clean various vehicle surfaces. For example, the assembly 10 can be hood mounted, under hood mounted, cowl screen mounted, or wiper arm mounted. In another example, the assembly 10 can be integrated in or mounted on a rear end spoiler or a center high-mounted stop lamp (CHMSL).

Figure 16:
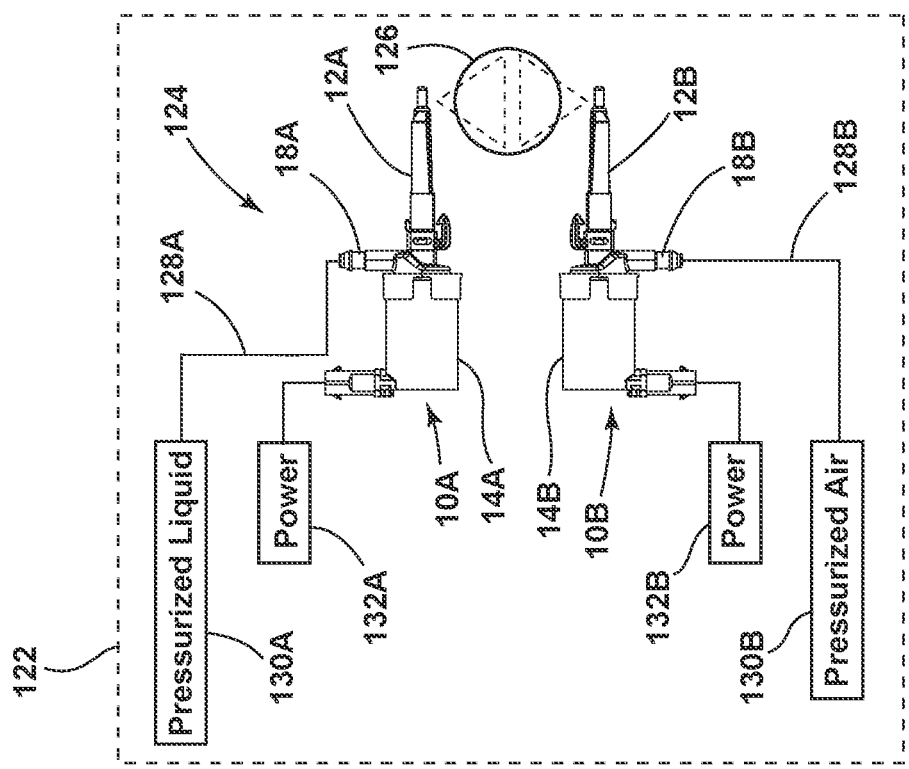
FIG. 16 is a schematic illustration of a vehicle including multiple assemblies for cleaning a vehicle surface according to FIG. 1.

In FIG. 16, another embodiment of the system 124 is shown. The system 124 is substantially similar to the system 124 shown in FIG. 15, save for having at least two of the nozzle/valve assemblies 10A, 10B as described with respect to FIGS. 1-14, including a first a first liquid flow control valve 14A for controlling the flow of a cleaning liquid to a first nozzle 12A and a second air flow control valve 14B for controlling the flow of a cleaning air to a second nozzle 12B. The nozzles 12A, 12B are positioned to deliver cleaning media to the same vehicle surface 126. A liquid flow pathway 128A supplies pressurized cleaning liquid 130A to the inlet 18A of the first valve 14A and an air flow pathway 128B supplies pressurized cleaning air 130B to the inlet 18B of the second valve 14B.

In an alternative embodiment of the systems 124 shown in FIGS. 15-16, the nozzles 12, 12A, 12B can be remote from the valves 14, 14A, 14B, with a fluid line such as a hose, tubing, or other conduit, fluidly connecting the outlet of the valves 14, 14A, 14B with an inlet of the nozzles 12, 12A, 12B.

Figure 17:
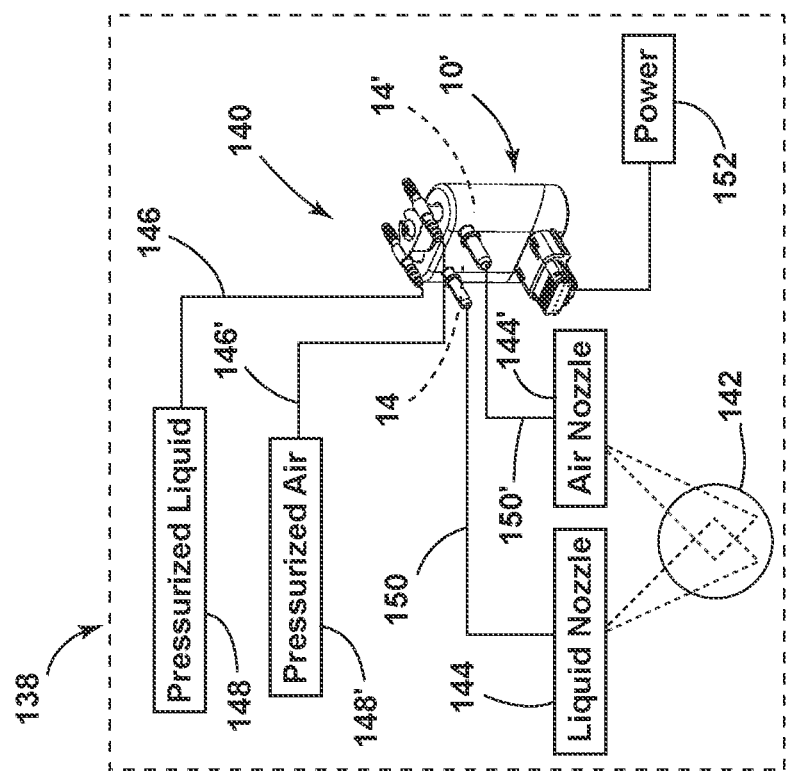
FIG. 17 is a schematic illustration of a vehicle including a dual flow control valve assembly for cleaning a vehicle surface according to another embodiment of the invention.

In FIG. 17, yet another embodiment of a vehicle with a system 140 for cleaning a vehicle surface 142 is schematically illustrated. The system 140 includes a dual flow control valve assembly 10' having a dual valve structure, including a first flow control valve 14 for controlling the flow of a first cleaning media to a first nozzle 144 and a second flow control valve 14' for controlling the flow of a second cleaning media to a second nozzle 144'. Optionally, depending on the application, the first cleaning media can comprise a liquid and the second cleaning media can comprise air.

The nozzles 144, 144' are positioned to deliver cleaning media to the same vehicle surface 142. A first flow pathway 146 supplies pressurized cleaning media 148, such as liquid, to the first valve 14 of the assembly 10' and a second flow pathway 146' supplies pressurized cleaning media 148', such as air, to the second valve 14' of the assembly 10'. Cleaning media 148, 148' is put under pressure from an external system, e.g. one or more pumps or compressors (not shown). The operating pressure can optionally be less than 15 bar, alternatively between 1 and 10 bar, inclusive.

The nozzles 144, 144' can be remote from the assembly 10', with a first fluid line 150 fluidly connecting an outlet of the first valve 14 with an inlet of the first nozzle 144 and a second fluid line 150' fluidly connecting an outlet of the second valve 14' with an inlet of the second nozzle 144'. In other embodiments to nozzles 144, 144' can be local to or directly attached with the assembly 10'.

The assembly 10' is connected to a power supply 150 of the vehicle 122. The open/close status of each valve 14, 14' can be independently controlled on demand from a control unit (not shown). The supply of each cleaning media to the assembly 10' can be automated, with cleaning media being supplied automatically predetermined intervals or on an as-needed basis, or can be manual, such as by providing a switch (not shown) in the vehicle cabin that is manually-actuatable by a driver of the vehicle.

The system 140 can further be provided with at least one heating element for heating the cleaning media before it is applied to the vehicle surface, and additional conduits, ducts, tubing, hoses, fluid connectors, and/or manifolds (not shown) fluidly coupling components of the system 140 together and providing fluid flow paths from the source of pressurized cleaning fluid 130 to the assembly 10'.

The vehicle surface 142 can comprise a camera, a sensor, a front windshield, a rear windshield, a headlight or headlamp, other another vehicle surface. The assembly 10' can be mounted in various locations on the vehicle 138 to the clean various vehicle surfaces. For example, the assembly 10 can be hood mounted, under hood mounted, cowl screen mounted, or wiper arm mounted. In another example, the assembly 10' can be integrated in or mounted on a rear end spoiler or a center high-mounted stop lamp (CHMSL).

Figure 18:
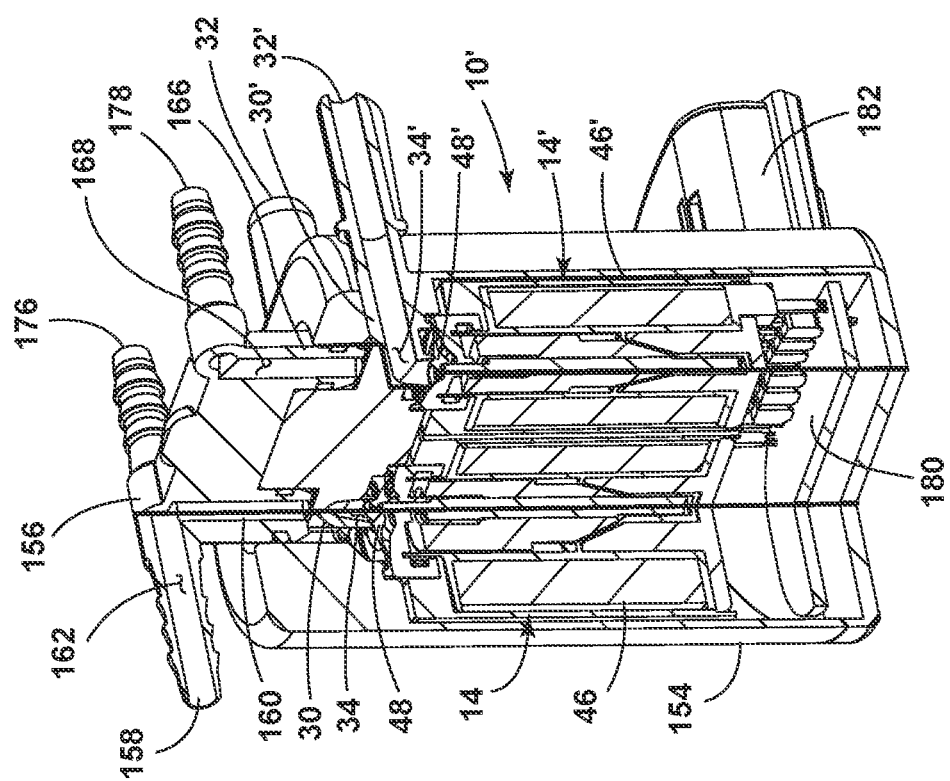
FIG. 18 is a sectional view of the dual flow control valve assembly of FIG. 17.
Figure 19:
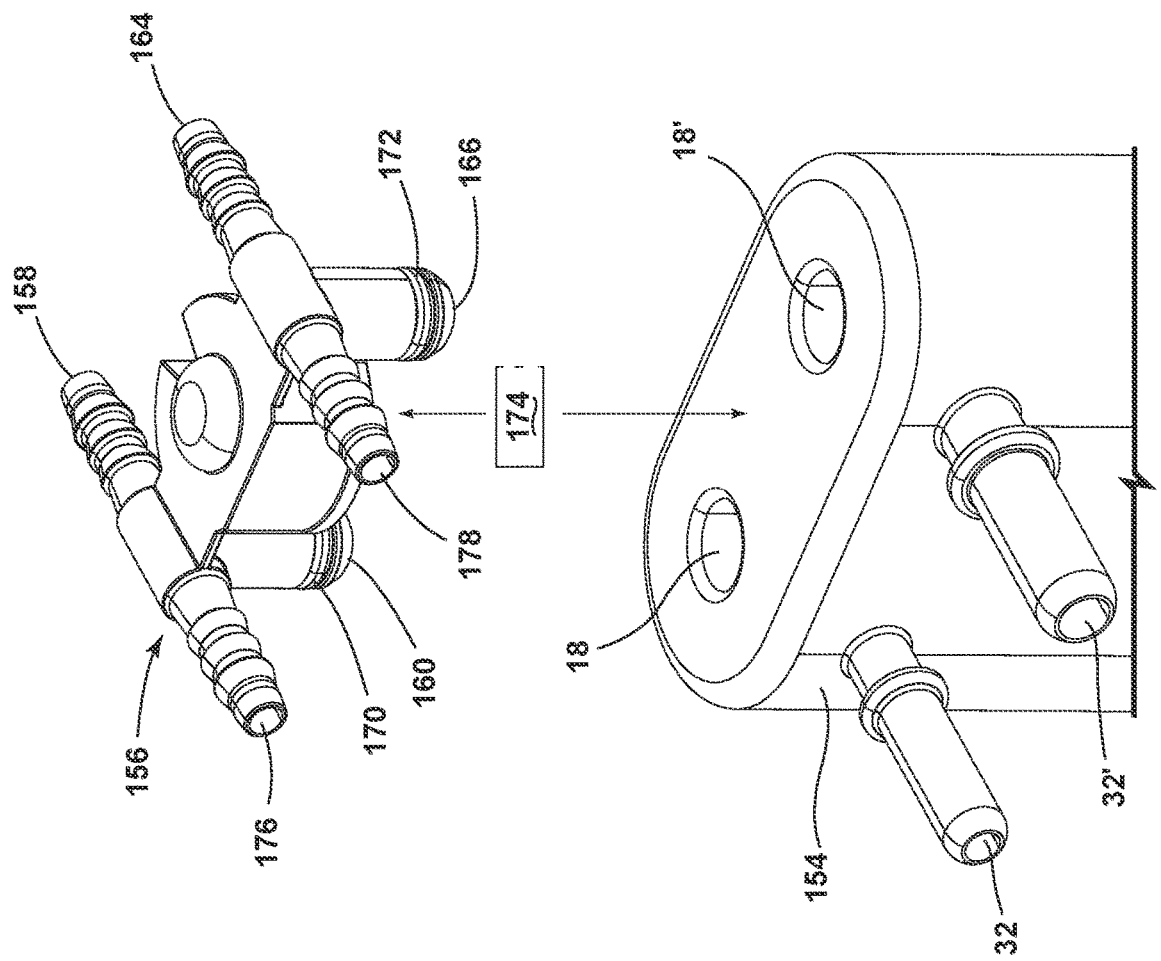
FIG. 19 is a schematic illustration of a quick connect coupling for the dual flow control valve assembly.

In FIGS. 18-19, one embodiment of the dual flow control valve assembly 10' is shown. Each valve 14, 14' of the assembly 10' can be substantially similar to the valve 14 described above with respect to FIGS. 1-14. The assembly 10' includes a valve body 30, 30' for each valve 14, 14'. Each valve body 30, 30' has a valve inlet 18, 18', valve outlet 32, 32', and fluid passage 34, 34' as described previously. Each valve 14, 14', includes a solenoid actuator 46, 46' and flexible diaphragm 48, 48' as described previously.

The assembly 10' includes at least one housing for each associated solenoid actuators 46, 46'. In the illustrated embodiment, the assembly 10' can comprise a housing 154 defining an interior space configured to receive both solenoid actuators 46, 46' and which is integrally formed with the valve bodies 30, 30', such as by plastic injection molding. In other embodiments, valve bodies 30, 30' can be formed separately from and coupled with the actuator housing, for example using any suitable mechanical coupling or other interlock, such as a snap fit coupling or joint.

In some embodiments, the assembly 10' can include an adaptor 156 which joins the valves 14, 14' to a cleaning media supply system, such as the system 140 schematically illustrated in FIG. 17. The adaptor 156 for the dual flow control valve assembly 10' includes a first inlet 158 configured for fluid communication with a source of pressurized cleaning media, such as liquid, a first outlet 160 in fluid communication with the valve inlet 18 of the first flow control valve 14, and a fluid passage 162 between the inlet 158 and the outlet 160. The adaptor 156 also includes a second inlet 164 configured for fluid communication with a source of pressurized cleaning media, such as air, a second outlet 166 in fluid communication with the valve inlet 18' of the second flow control valve 14', and a fluid passage 168 between the inlet 164 and the outlet 166.

The valve inlets 18, 18' can be configured to accept the outlets 160, 166 of the adaptor 156 to establish a fluid connection between the sources of pressurized cleaning media, for example 148, 148' shown in FIG. 17, and the valves 14, 14' via the adaptor 156. Sealing elements 170, 172 can be provided at the interfaces between the outlets 160, 166 and the valve inlets 18, 18' to prevent leakage of cleaning media at the interfaces. In illustrative embodiment, the sealing elements 170, 172 are O-rings carried on the adaptor outlets 160, 166.

In some embodiments, the adaptor 156 can be connectable to the housing 154 via a quick connect coupling 174, whereby the assembly 10 can be quickly connected and unconnected to the adaptor 156 by hand. More specifically, the valve inlets 18, 18' can be quickly connected and unconnected to the adaptor outlets 160, 166 by hand. Various configurations for the quick connect coupling 174 are possible. Examples of quick connector couplings are described in U.S. Pat. No. 7,823,930, which is incorporated by reference herein in its entirety.

In some embodiments, the adaptor 156 can comprise a manifold, with the passages 162, 168 branching into more than one outlet. Optionally, the manifold adaptor further includes a first bypass 176 extending from the first passage 162 for conducting cleaning media, such as liquid, around the first flow control valve 14 and a second bypass 178 extending from the second passage 168 for conducting cleaning media, such as air, around the second flow control valve 14'.

The bypasses 176, 178 can optionally provide cleaning media to another downstream dual flow control valve assembly, or other flow control valve, such as in a "daisy chain" system where multiple valves/nozzles are fed from a common source of pressurized cleaning media. In other embodiments of the assembly 10' where a daisy chain system is not required, the bypasses 176, 178 may not be included.

It is noted that while the manifold is shown as being provided with the adaptor 156, in other embodiments, the manifold can be formed with or otherwise provided on the assembly 10' without the adaptor 156.

A single PCB 180 drives both the first and second solenoid actuators 46, 46'. A single power connector 182 on the housing 154 is connectable to an external current supply to control the solenoid actuators 46, 46' by an electrical current that passes through the coils 52, 54'. The open/close status of each valve 14, 14' can be independently controlled on demand, allowing for the valves 14, 14' to be opened individually, simultaneously, or in another desired sequence.

Figure 20:
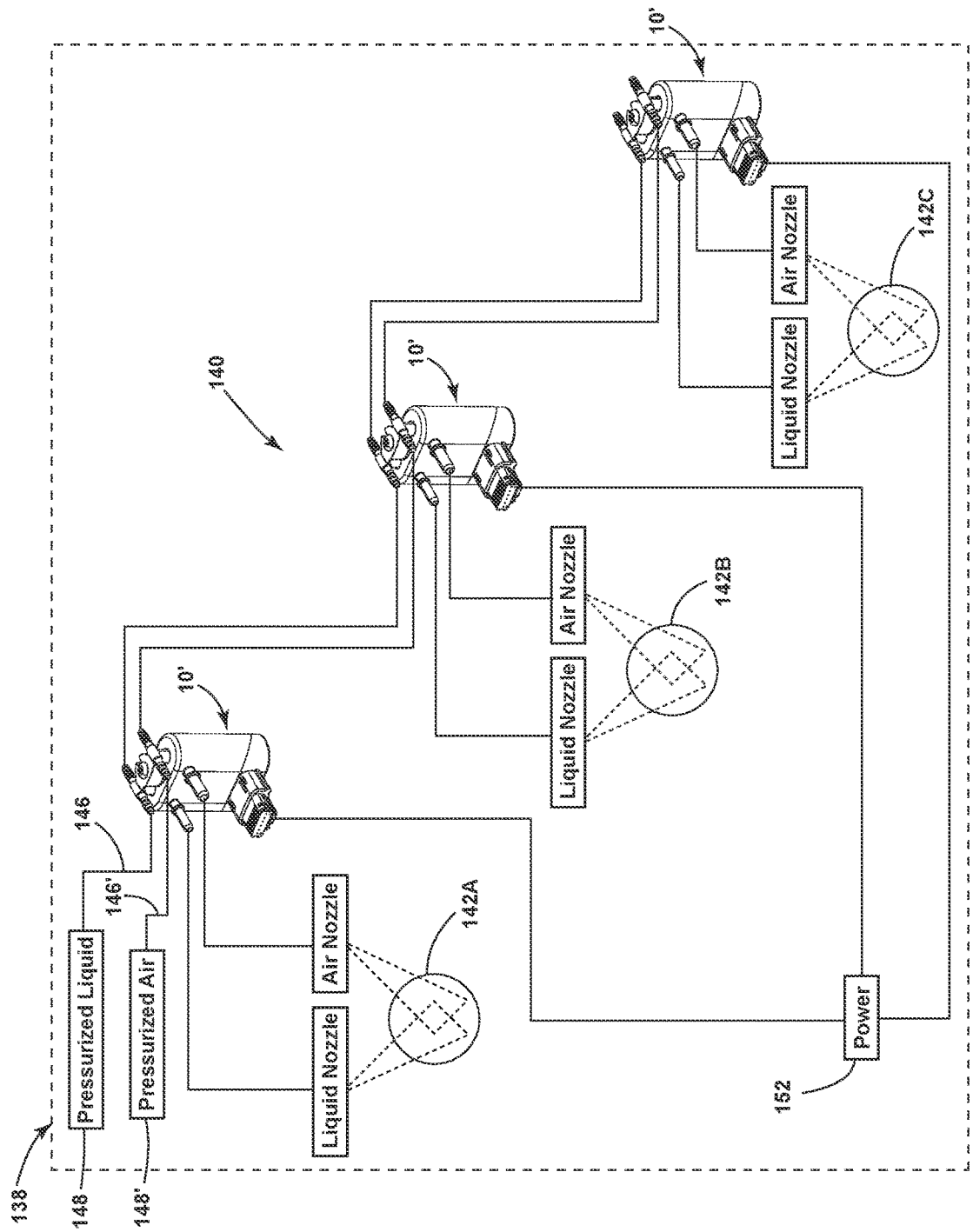
FIG. 20 is a schematic illustration of a vehicle including multiple dual flow control valve assemblies in a daisy chain system.

In FIG. 20, another embodiment of the system 140 is shown. The system 140 is substantially similar to the system 140 shown in FIG. 17, save for having multiple dual flow control valve assemblies 10' in a "daisy chain" fed from the sources of pressurized cleaning media 148, 148'. Each assembly 10' controls the flow of cleaning media to a different vehicle surface 142A, 142B, 142C. The flow pathways 146, 146' include additional fluid lines fluidly connecting one assembly 10' to another assembly 10'.

Figure 21:
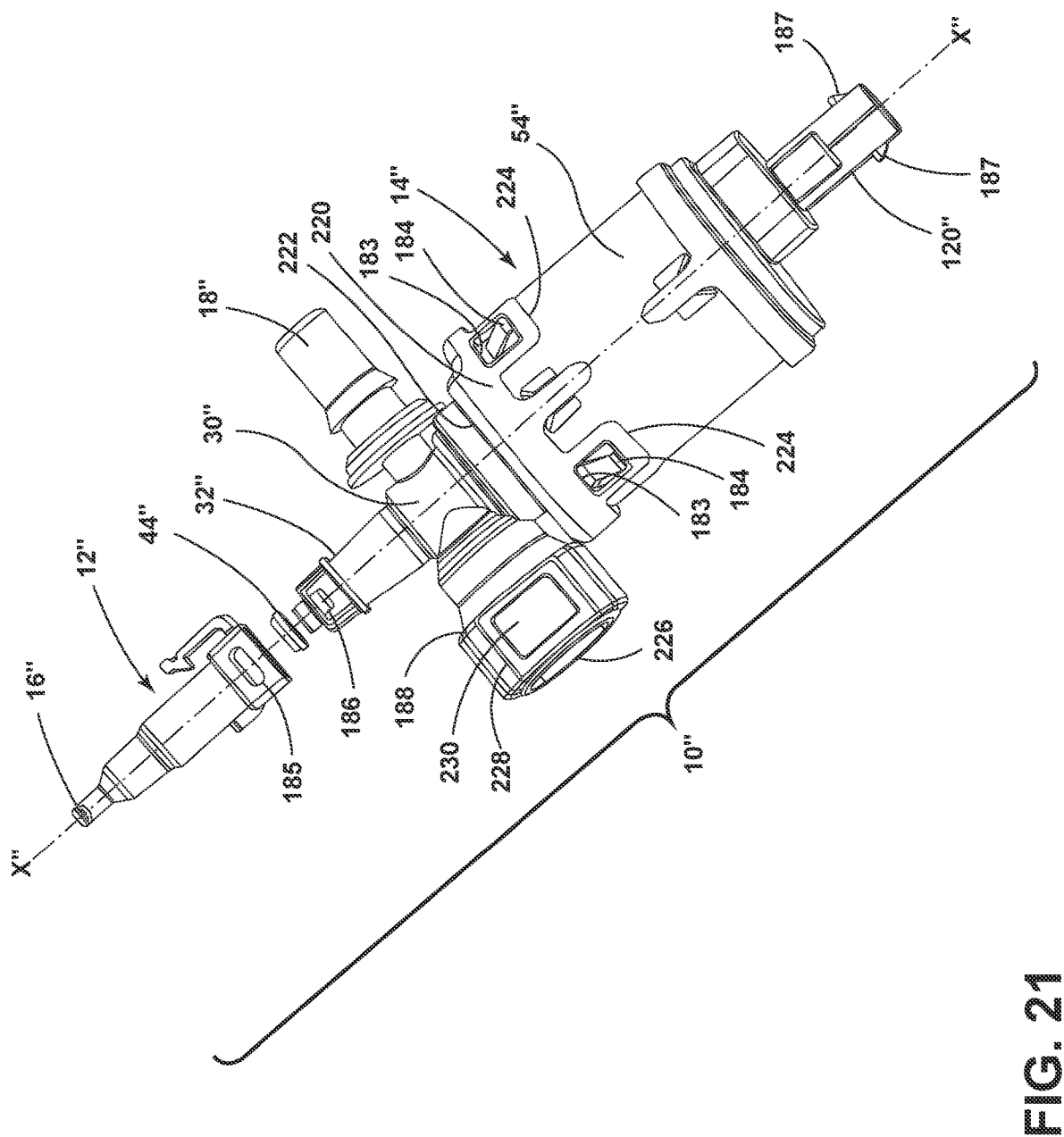
FIG. 21 is a partially-exploded view of a flow control valve assembly according to another embodiment of the invention.

In FIG. 21, a flow control valve assembly 10" according to still another embodiment is illustrated. The assembly 10" includes a nozzle 12" and a valve 14" that controls the flow of cleaning media through the nozzle 12". Like the embodiment of FIGS. 1-14, the nozzle 12" is integrated with the electronic valve 14", which can allow for electronically controlled nozzle activation, reduced leakage, and faster response time. The nozzle 12" and valve 14" of the assembly 10" can be substantially similar to the nozzle 12 and valve 14 described above with respect to FIGS. 1-14, and like elements are referred to with the same reference numerals bearing a double prime (") symbol.

One difference between the embodiments is that the power connector 120" of the present embodiment is disposed on the end of the actuator housing 54" rather than on the side as seen in FIGS. 1-3 of the first embodiment. The power connector 120" extends axially along the longitudinal assembly axis X", and in the embodiment shown extends coaxially with the nozzle 12".

Another difference is that the length of the nozzle 12" relative to the length valve 14" is shorter in the present embodiment as compared with the embodiment shown in FIGS. 1-2. A shorter nozzle length provides a more compact assembly 10" in which the cleaning media outlet 16" is closer to the valve 14".

Yet another difference between the embodiments is that snap-fit connections are provided for the valve body 30", the nozzle 12" and the power connector 120". In the embodiment shown, the valve body 30" is snapped onto the actuator housing 54" and the nozzle 12" is snapped onto the outlet 32" to establish the assembled positions of the components in a modular assembly 10". The modular assembly 10" can then be installed on a vehicle. Such installation can be completed by making necessary fluid and electrical connections, including connecting the valve body 30" with a fluid source and the power connector 120" with a power source, as described in more detail below.

In the embodiment shown, the valve body 30" is snapped onto the actuator housing 54" to establish a mounted position of valve body 30" on the actuator 46". The valve body 30" can be pushed onto the actuator housing 54" in a direction along axis X". Various connection means can aid in connecting the valve body 30" with the actuator housing 54". As shown, a snap-lock receiver 183 can be provided on the valve body 30" and a snap-lock detent 184, can be provided at any suitable location on the actuator 46", such as on the actuator housing 54". The snap-lock detent 184 is engageable with the snap-lock receiver 183 to retain the valve body 30" in the mounted position on the actuator housing 54". Generally, it can be advantageous having a snap-fit connection with the actuator 46", as this allows the valve body 30" to be easily removed for servicing and/or provides a mounting that can interchangeably receive different valve bodies, including those with or without a bypass connector 188 as described in further detail below. It is noted that while two receivers and detents are visible in FIG. 21, additional receivers and detents may be provided and may be spaced radially about the valve body 30" and the actuator housing 54".

The snap-lock receivers 183 can be disposed on a skirt 220 of the valve body 30" that is sized to fit over and in close contact with the actuator housing 54". The valve body 30" can include an end wall 222 traverse or oblique to the axis X", with the skirt 220 depending from the end wall 222 and extending longitudinally in a direction opposite the outlet 32".

The skirt 220 can be generally annular, as shown herein, and comprises multiple flex members 224. The snap-lock receivers 183 can be formed as openings through the flex members 224. In other embodiments, the skirt 220 can be non-annular, and/or can comprise one continuous sidewall. The snap-lock detents 184 can protrude from an outer surface of the actuator housing 54", and sliding the valve body 30" onto the actuator housing 54" can cause the flex members 224 to flex outwardly before the detents 184 snap into the receivers 183, whereupon the flex members 224 flex back to embrace the actuator housing 54".

In the embodiment shown, the nozzle 12" is snapped onto the outlet 32" to establish a mounted position of nozzle 12" on the valve 14". The nozzle 12" can be pushed onto the outlet 32" in a direction along axis X". Various connection means can aid in connecting the nozzle 12" with the valve 14". As shown, a snap-lock receiver 185 can be provided on the nozzle 12" and a snap-lock detent 186, can be provided at any suitable location on the outlet 32". The snap-lock detent 186 is engageable with the snap-lock receiver 185 to retain the nozzle 12" in the mounted position on the valve 14". Generally, it can be advantageous having a snap-fit connection with the nozzle 12", as this allows the nozzle 12" to be easily removed for servicing and/or provides a mounting that can interchangeably receive different nozzles. It is noted that while only one receiver and detent are visible in FIG. 21, a second receiver and detent may be provided in opposition to the visible receiver and detent.

A snap-lock element 187, such as a snap-lock detent, can be provided at any suitable location on the power connector 120" and is engageable with a snap-lock receiver (not shown) on a corresponding connector to establish an electrical connection between the valve 14" and a power source. Electronically controlled spray activation is provided by a signal input to the power connector 120". Generally, it can be advantageous having a snap-fit connection with the power supply, as this allows for the assembly 10" to be modular, easily removed for servicing, and/or provides a mounting that can interchangeably receive different corresponding connectors to establish an electrical connection between the valve 14" and a power source.

Yet another difference is that the assembly 10" is connectable with other valve assemblies, such as in a "daisy chain" system where multiple valves/nozzles are fed from a common source of pressurized cleaning media. The assembly 10" comprises a bypass connector 188 defining at least a portion of a bypass passage that conducts cleaning media around the valve 14". In the embodiment shown, the bypass connector 188 can be coupled to the valve body 30", which includes the inlet 18" and the outlet 32", and the bypass passage conducts cleaning media around the diaphragm (not shown, but similar to diaphragm 48 of FIG. 3) that operates to open and close the valve 14". The bypass passage can branch off from the fluid passage between inlet 18" and the outlet 32". In the embodiment shown, the bypass connector 188 projects radially in a direction generally opposite the inlet 18". Other locations for the bypass connector 188 are possible.

The bypass connector 188 can be coupled with a hose or other conduit to provide cleaning media to another downstream flow control valve. The bypass connector 188 can comprise a quick connect coupling 226, whereby a hose or other conduit can be quickly connected and unconnected to the bypass connector 188 by hand. Various configurations for the quick connect coupling 174 are possible. In one embodiment, the quick connect coupling 226 comprises a receiving part 228 connectable to an end (not shown) of a hose or other conduit and a securing part 230 that moves to lock the end against displacement from the receiving part 228 Examples of quick connector couplings are described in U.S. Pat. No. 7,823,930, which is incorporated by reference herein in its entirety.

Unlike traditional systems which use a hose to connect the valve and the nozzle, with the nozzle often remote from the valve, the assembly 10" of FIG. 21 has the spray nozzle 12" integrated directly with the electronic valve 14". As such, the need for a hose and hose routing is eliminated, and fewer leak paths are included. In FIG. 21, the nozzle 12" is exploded from the valve 14", along with the sealing element 44" that is provided at the interface between the nozzle 12' and the valve body 30' to prevent leakage of cleaning media at the interface. Along these same lines, response time is faster since the distance from the electronic valve 14" to the nozzle 12" is shortened.

Figure 22:
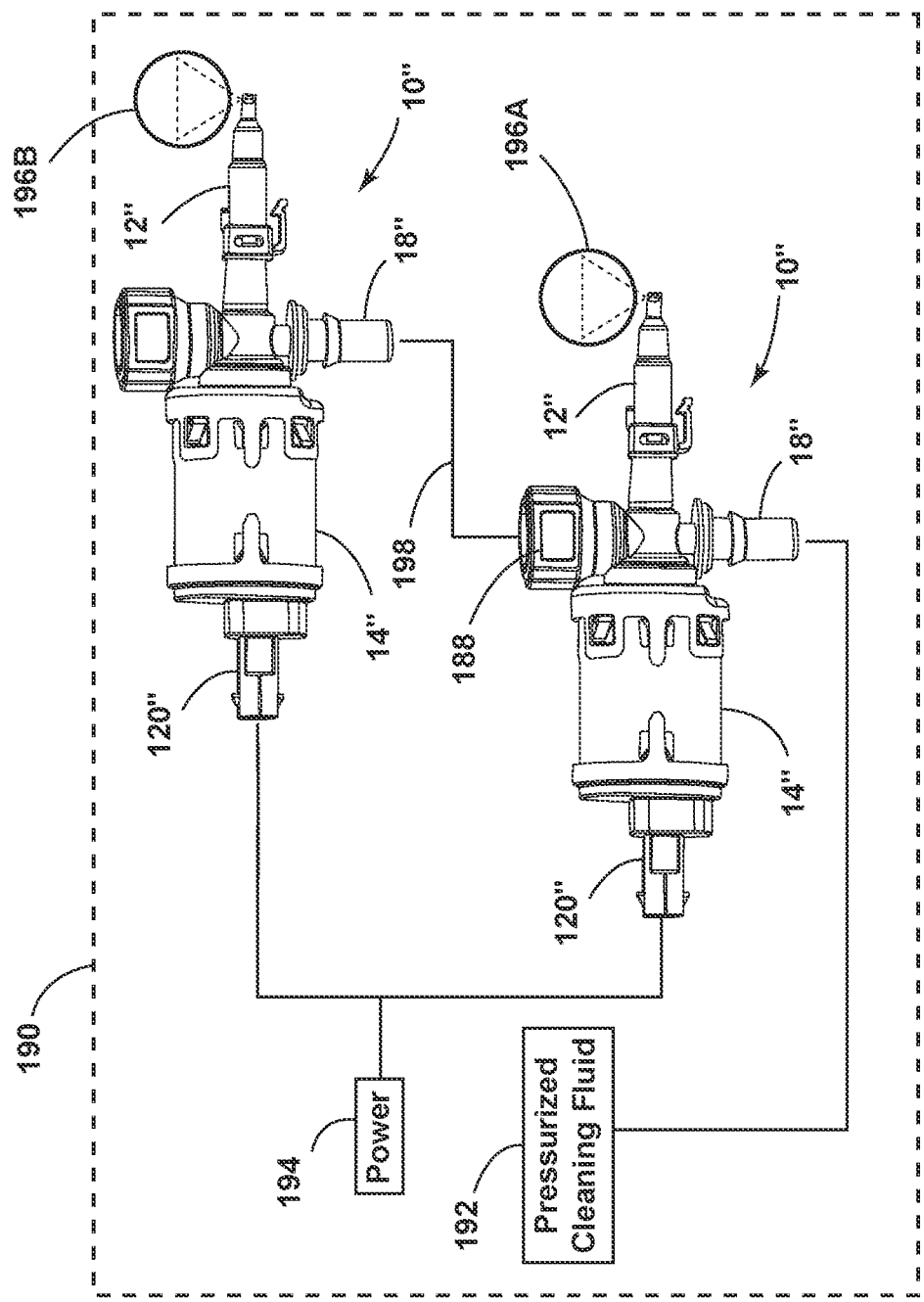
FIG. 22 is a schematic illustration of multiple flow control valve assemblies of FIG. 21 in a daisy chain system.

In FIG. 22, a system 190 including multiple flow control valve assemblies 10" is schematically illustrated. The assemblies 10" are arranged in a "daisy chain" fed from a source of pressurized cleaning media 192. Both assemblies 10" are connected to a power supply 194, and electronically controlled spray activation is provided by an electrical valve signal input to the power connector 120". Each assembly 10" controls the flow of cleaning media to a different vehicle surface 196A, 196B. The flow pathway between the bypass connector 188 of one assembly 10" include at least one hose, conduit, or other fluid line 198 connected to the inlet 18" of another assembly 10".

Figure 24:
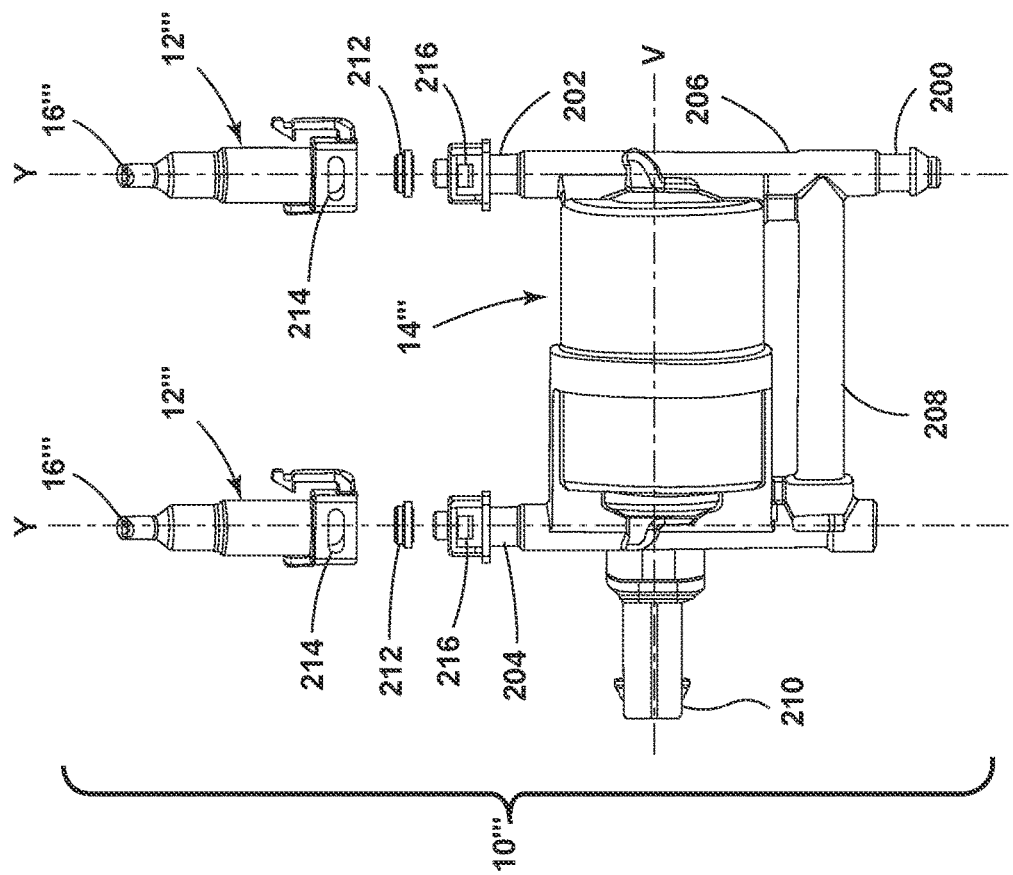
FIG. 24 is a partially-exploded view of the flow control valve assembly of FIG. 23.
Figure 23:
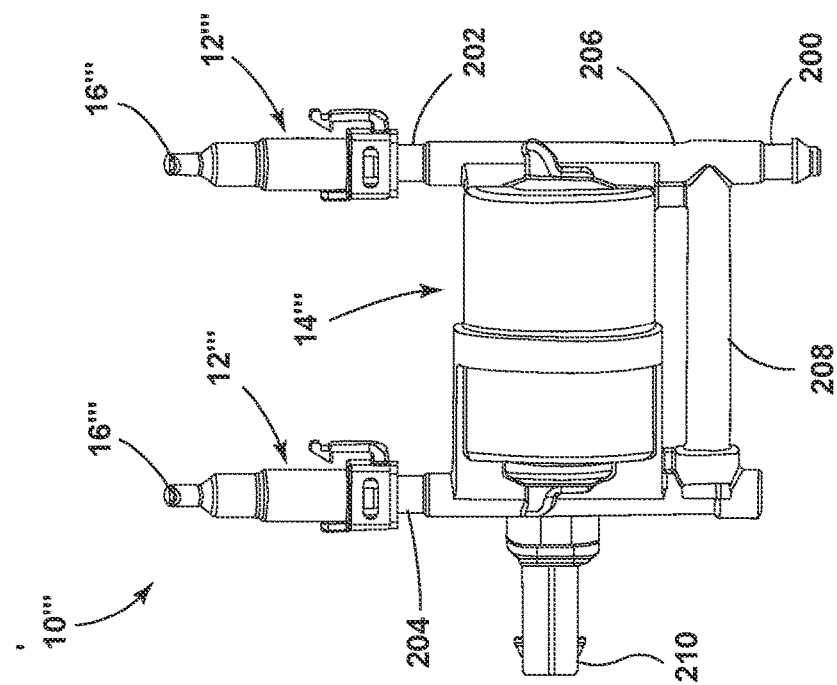
FIG. 23 is a perspective view of a flow control valve assembly according to yet another embodiment of the invention.

In FIGS. 23-24, a flow control valve assembly 10''' according to still another embodiment is illustrated. The assembly 10''' includes two nozzles 12''' and a valve 14''' that controls the flow of cleaning media through the nozzles 12'''. Like the embodiment of FIGS. 1-14, the nozzles 12''' are integrated with the electronic valve 14''', which can allow for electronically controlled nozzle activation, reduced leakage, and faster response time. The nozzles 12''' and valve 14''' of the assembly 10''' can be substantially similar to the nozzle 12 and valve 14 described above with respect to FIGS. 1-14, and like elements are referred to with the same reference numerals bearing a double prime (") symbol.

One difference between the embodiments is that two spray nozzles 12''' are integrated with one electronic valve 14'''. The assembly 10''' includes an inlet 200 and two outlets 202, 204, one for each of the spray nozzles 12'''. Like the first embodiment, each outlet 202, 204 can comprise a hollow tip projecting through a proximal inlet end of the associated nozzle 12'''. To provide fluid flow to both nozzles 12''', a first fluid passage 206 fluidly connects the inlet 200 and first outlet 202, and a second fluid passage 208 fluidly connects the inlet 200 and the second outlet 204. Inside the valve 14''', an actuator (not shown) and two deformable diaphragms (not shown, but similar to diaphragm 48 of FIG. 3) operate to open and close the passages 206, 208. The actuator is operable to move back and forth to alternately push against the diaphragms on at a time, thereby switching opening of the passages and operating the spray nozzles 12''' in an alternating fashion. Like previous embodiments, the actuator may preferably be a solenoid actuator. The assembly 10''' includes a power connector 210 connected to the actuator, and electronically controlled spray activation is provided by a signal input to the power connector 210.

The nozzles 12''' are directly connected with the valve outlets 202, 204. In the illustrated embodiment, the nozzle 12 and the valve outlets 202, 204 are separate components, and can be attached together by using any suitable mechanical coupling or other interlock, such as a snap fit coupling or quick-connect coupling. A sealing element 212 is provided at the interface between each nozzle 12''' and outlet 202, 204 to prevent leakage of cleaning media at this interface. In illustrative embodiment, the sealing element 212 is manufactured from an elastomeric material, such as silicone rubber.

In the embodiment shown, the nozzle 12''' is snapped onto the outlet 202, 204 to establish a mounted position of nozzle 12''' on the valve 14'''. The nozzles 12''' can be elongated along axes Y, which may be parallel to each other, and can be pushed onto the outlets 202, 204 in a direction along the axis, which is generally perpendicular to a valve axis V. Various connection means can aid in connecting the nozzle 12''' with the valve 14". As shown, a snap-lock receiver 214 can be provided on the nozzle 12''' and a snap-lock element 216, such as a snap-lock detent, can be provided at any suitable location on the outlet 202, 202. The snap-lock element 216 is engageable with the snap-lock receiver 214 to retain the nozzle 12''' in the mounted position on the valve 14'''.

The cleaning media outlets 16''' can be configured to direct a spray of cleaning media generally radially inwardly with respect to the axes Y, such that the cleaning media from both nozzles 12''' is directed at the same target area, such as at the same vehicle surface. In other words, the outlet 16''' of one nozzle 12''' directs a spray of cleaning media toward the other nozzle 12'''.

Unlike traditional systems which use a hose to connect the valve and a single nozzle, with the nozzle often remote from the valve, the assembly 10''' of FIG. 23-24 has the two nozzles 12" integrated directly with the electronic valve 14". As such, the need for a hose and hose routing is eliminated, and fewer leak paths are included. Along these same lines, response time is faster since the distance from the electronic valve 14" to the nozzles 12" are shortened.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

It is to be understood that the appended claims are not limited to express and particular apparatus or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology that has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An assembly for cleaning a vehicle surface comprising:
   a nozzle comprising a proximal inlet end and a distal outlet end, at least one cleaning fluid outlet at the distal outlet end, and a peripheral wall elongated along a longitudinal assembly axis;
   an electronic valve controlling a flow of a cleaning media to the nozzle, the electronic valve comprising:
      a valve body,
      a valve inlet configured for fluid communication with a source of pressurized cleaning media, the valve inlet projecting radially from a side wall of the valve body relative to the longitudinal assembly axis;
      a valve outlet comprising a hollow tip projecting longitudinally from an end of the valve body along the longitudinal assembly axis, the hollow tip comprising at least one orifice;
      a fluid passage formed in the valve body and providing a pathway between the valve inlet and the valve outlet;
      a valve seat surrounding an opening in the fluid passage between the valve inlet and the valve outlet;
      an actuator comprising a plunger having a sealing pin; and
      a flexible diaphragm moveable into engagement with the valve seat to close the electronic valve and out of engagement with the valve seat to open the electronic valve;
   a power connector connectable to an external current supply;
   an elastomeric sealing element; and
   a bypass connector defining at least a portion of a bypass passage that conducts cleaning media around the flexible diaphragm, the bypass passage branching off from the fluid passage between the valve inlet and the valve outlet;
   wherein the proximal inlet end of the nozzle is directly connected to the valve outlet of the electronic valve and the hollow tip projects through the proximal inlet end of the nozzle;
   wherein the elastomeric sealing element is at an interface between the nozzle and the electronic valve to prevent leakage of cleaning media at the interface and is supported on the hollow tip; and
   wherein the bypass connector is disposed between the nozzle and the actuator, and the bypass connector extends radially from the valve body in a direction generally perpendicular to the longitudinal assembly axis and orthogonal to the elongated peripheral wall of the nozzle.

2. The assembly of claim 1, wherein the plunger is configured for linear reciprocal movement along the longitudinal assembly axis.

3. The assembly of claim 1, wherein the at least one cleaning fluid outlet is formed through the peripheral wall at the distal outlet end, and is configured to direct a spray of cleaning media generally radially with respect to the longitudinal assembly axis.

4. The assembly of claim 1, wherein a distal end of the valve body is closed, and the at least one orifice provided on the hollow tip is proximal of the closed distal end.

5. The assembly of claim 1, wherein the nozzle is snap-fit to the valve outlet to establish a mounted position of the nozzle on the valve outlet.

6. The assembly of claim 5, comprising a snap-lock receiver on the nozzle and a snap-lock element on the valve outlet, wherein the snap-lock element is engageable with the snap-lock receiver to retain the nozzle in the mounted position on the valve outlet.

7. The assembly of claim 1, wherein:
the nozzle comprises a first nozzle and the valve outlet comprises a first valve outlet;
the assembly comprises a second nozzle; and
the electronic valve comprises a second valve outlet, and the second nozzle is directly connected with the second valve outlet.

8. The assembly of claim 1, wherein the flexible diaphragm comprises a drain passage in registry with the valve outlet and a bypass hole in registry with the valve inlet, wherein the sealing pin is configured to press the flexible diaphragm against the valve seat to close the valve and block the drain passage, and wherein the electronic valve comprises a closing spring urging the plunger toward the flexible diaphragm.

9. The assembly of claim 1, wherein the flexible diaphragm comprises:
a drain passage comprising a first opening on a first side of the flexible diaphragm and a second opening on an opposing second side of the flexible diaphragm;
a bypass hole configured to equalize pressure on the first and second sides of the flexible diaphragm when the plunger is in a closed position;
a pin seat surrounding the first opening of the flexible diaphragm, wherein the sealing pin is in registry with the pin seat; and
a sealing protrusion surrounding the second opening on the second side of the flexible diaphragm;
said flexible diaphragm being flexible between an open state in which the sealing protrusion is spaced from the valve seat and permits cleaning media flow from the valve inlet through the valve outlet and a closed state in which the sealing protrusion is engaged with the valve seat and prevents cleaning media flow from the valve inlet through the valve outlet.

10. The assembly of claim 1, wherein the actuator comprises a solenoid actuator comprising:
a coil connectable to an external current supply, the plunger moveable within the coil between a closed position and an open position; and
an actuator housing including an outer housing and a core tube within the outer housing, wherein the coil is provided between the outer housing and a core tube, with the core tube isolating the coil from the cleaning media and housing the plunger.

11. An assembly for cleaning a vehicle surface comprising:
a nozzle comprising a proximal inlet end and a distal outlet end, at least one cleaning fluid outlet at the distal end, and a peripheral wall elongated along a longitudinal assembly axis;
an electronic valve controlling a flow of a cleaning media to the nozzle, the electronic valve comprising:
a valve body comprising a valve inlet configured for fluid communication with a source of pressurized cleaning media, a valve outlet, a fluid passage between the valve inlet and the valve outlet, a valve seat surrounding an opening in the fluid passage between the valve inlet and the valve outlet;
an actuator comprising a plunger having a sealing pin; and
a flexible diaphragm moveable into engagement with the valve seat to close the electronic valve and out of engagement with the valve seat to open the electronic valve;
a power connector connectable to an external current supply and comprising a snap-lock element configured to couple the power connector with a corresponding connector to establish an electrical connection between the electronic valve and a power source via a snap-fit connection;
an elastomeric sealing element at an interface between the nozzle and the electronic valve; and
a bypass connector defining at least a portion of a bypass passage that branches off from the fluid passage between the valve inlet and the valve outlet to conducts cleaning media around the flexible diaphragm, the bypass connector comprising a quick connect coupling, whereby a conduit can be connected and unconnected to the bypass connector by hand;
wherein the proximal inlet end of the nozzle is directly connected to the valve outlet of the electronic valve, and the valve inlet is outside the nozzle and projecting away from the longitudinal assembly axis;
wherein the valve body is snap-fit to the actuator to establish a mounted position of the valve body on the actuator and the nozzle is snap-fit to the valve body to establish a mounted position of the nozzle on the electronic valve; and
wherein the bypass connector is disposed between the nozzle and the actuator, and the bypass connector extends radially from the valve body in a direction generally perpendicular to the longitudinal assembly axis and orthogonal to the elongated peripheral wall of the nozzle.

12. The assembly for cleaning a vehicle surface of claim 11, wherein the valve outlet comprises a hollow tip projecting longitudinally from an end of the valve body along the longitudinal assembly axis, the hollow tip comprising at least one orifice, wherein the proximal inlet end of the nozzle abuts the end of the valve body and the hollow tip projects through the proximal inlet end and into the nozzle.

13. The assembly for cleaning a vehicle surface of claim 12, wherein the valve inlet projects radially from a side wall of the valve body in a direction generally perpendicular to the longitudinal assembly axis.

14. The assembly for cleaning a vehicle surface of claim 1, wherein the proximal inlet end of the nozzle abuts the end of the valve body and the hollow tip projects into the nozzle along an inside of the peripheral wall.

* * * * *